(12) United States Patent
Peterson et al.

(10) Patent No.: US 10,895,283 B2
(45) Date of Patent: *Jan. 19, 2021

(54) BEARING ASSEMBLIES INCLUDING AT LEAST ONE SUPERHARD BEARING ELEMENT HAVING SELECTED SURFACE CHARACTERISTICS AND METHODS OF MANUFACTURE

(71) Applicant: US SYNTHETIC CORPORATION, Orem, UT (US)

(72) Inventors: S. Peterson, Orem, UT (US); Jair Jahaziel Gonzalez, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,896

(22) Filed: Nov. 27, 2019

(65) Prior Publication Data

US 2020/0173495 A1    Jun. 4, 2020

Related U.S. Application Data

(63) Continuation of application No. 15/204,823, filed on Jul. 7, 2016, now Pat. No. 10,527,093.

(Continued)

(51) Int. Cl.
*F16C 33/04* (2006.01)
*F16C 17/06* (2006.01)
(Continued)

(52) U.S. Cl.
CPC ............ *F16C 33/043* (2013.01); *F16C 43/02* (2013.01); *F16C 17/02* (2013.01); *F16C 17/04* (2013.01);
(Continued)

(58) Field of Classification Search
CPC ........ F16C 17/02; F16C 17/035; F16C 17/04; F16C 17/065; F16C 17/26; F16C 33/043;
(Continued)

(56) References Cited

U.S. PATENT DOCUMENTS 5,447,208 A    9/1995    Lund et al.
5,560,716 A    10/1996   Tank et al.
(Continued)

FOREIGN PATENT DOCUMENTS

WO    2015126080 A1    8/2015

OTHER PUBLICATIONS

U.S. Appl. No. 15/204,823, filed Jul. 7, 2016.
U.S. Appl. No. 62/194,645, filed Jul. 20, 2015.
U.S. Appl. No. 62/087,132, filed Dec. 3, 2014.

*Primary Examiner* — James Pilkington
(74) *Attorney, Agent, or Firm* — Dorsey & Whitney LLP

(57) ABSTRACT

Embodiments of the invention related to bearing assemblies and methods of forming the bearing assemblies that include at least one superhard bearing element exhibiting a superhard bearing surface having a polished surface finish or a superhard bearing surface having a textured surface. In an embodiment, a bearing assembly includes a support ring. The bearing assembly includes at least one superhard bearing element. The at least one superhard bearing element includes a superhard bearing surface having a polished surface finished or a textured surface. The at least one superhard bearing element is secured to the support ring.

18 Claims, 19 Drawing Sheets

Related U.S. Application Data

(60) Provisional application No. 62/194,645, filed on Jul. 20, 2015.

(51) Int. Cl.
  *F16C 17/04* (2006.01)
  *F16C 17/02* (2006.01)
  *F16C 43/02* (2006.01)

(52) U.S. Cl.
  CPC ........ *F16C 17/065* (2013.01); *F16C 2202/04* (2013.01); *F16C 2220/70* (2013.01); *F16C 2240/54* (2013.01); *F16C 2352/00* (2013.01)

(58) Field of Classification Search
  CPC .. F16C 43/02; F16C 2202/04; F16C 2206/04; F16C 2206/82; F16C 2220/62; F16C 2220/70; F16C 2240/54
  See application file for complete search history.

(56) References Cited

U.S. PATENT DOCUMENTS

| | | |
|---|---|---|
| 5,563,300 A | 10/1996 | Sounik et al. |
| 5,967,250 A | 10/1999 | Lund et al. |
| 6,145,608 A | 11/2000 | Lund |
| 7,866,418 B2 | 1/2011 | Bertagnolli et al. |
| 7,998,573 B2 | 8/2011 | Qian et al. |
| 8,034,136 B2 | 10/2011 | Sani |
| 8,220,999 B2 | 7/2012 | Cooley et al. |
| 8,236,074 B1 | 8/2012 | Bertagnolli et al. |
| 8,545,103 B1 | 10/2013 | Cooley et al. |
| 8,651,743 B2 | 2/2014 | Peterson et al. |
| 8,807,837 B1 * | 8/2014 | Gonzalez ............. F16C 37/002 384/303 |
| 8,882,869 B2 * | 11/2014 | DiGiovanni ........... F16C 33/043 51/307 |
| 9,702,198 B1 | 7/2017 | Topham |
| 2014/0178637 A1 | 6/2014 | Rajagopalan et al. |
| 2015/0368578 A1 | 12/2015 | Woydt et al. |

* cited by examiner

BEARING ASSEMBLIES INCLUDING AT LEAST ONE SUPERHARD BEARING ELEMENT HAVING SELECTED SURFACE CHARACTERISTICS AND METHODS OF MANUFACTURE

CROSS-REFERENCE TO RELATED APPLICATIONS

This application is a continuation of U.S. application Ser. No. 15/204,823 filed on 7 Jul. 2016, which claims priority to U.S. Provisional Application No. 62/194,645 filed on 20 Jul. 2015. The disclosure of each of the foregoing applications is incorporated herein, in their entirety, by this reference.

BACKGROUND

Wear-resistant, superhard compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs and other superhard compacts have found particular utility as superhard bearing elements in thrust-bearings within pumps, turbines, subterranean drilling systems, motors, compressors, generators, gearboxes, electric submersible pumps, and other systems and apparatuses. For example, a PDC bearing element typically includes a superhard diamond layer that is commonly referred to as a diamond table. The diamond table is formed and bonded to a substrate using a high-pressure/high-temperature ("HPHT") process.

A thrust-bearing apparatus includes a number of superhard bearing elements affixed to a support ring. The superhard bearing elements (e.g., a PDC bearing element) bear against other superhard bearing elements of an adjacent bearing assembly during use. Superhard bearing elements are typically brazed directly into a preformed recess formed in a support ring of a fixed-position thrust-bearing.

Despite the availability of a number of different bearing apparatuses including such PDCs and/or other superhard materials, manufacturers and users of bearing apparatuses continue to seek bearing apparatuses that exhibit improved performance characteristics, lower cost, or both.

SUMMARY

Embodiments of the invention related to bearing assemblies and methods of forming the bearing assemblies that include a superhard bearing surface having an at least partially polished surface finish and/or a textured surface that wears-in relatively faster compared to an un-textured surface. In an embodiment, a bearing assembly includes a support ring. The bearing assembly includes at least one superhard bearing element. The at least one superhard bearing element includes a superhard bearing surface having an at least partially polished surface finished. The at least one superhard bearing element is secured to the support ring. The bearing assembly further includes at least one packaging material adjacent to the support ring and the at least one superhard bearing element. The at least one packaging material is configured to protect the at least partially polished surface finish of the superhard bearing surface.

In an embodiment, a bearing assembly includes a support ring. The bearing assembly further includes at least one superhard bearing element secured to the support ring. The at least one superhard bearing element includes a superhard bearing surface having a textured surface. The textured surface exhibits a plurality of raised surface features exhibiting an average depth of about 50 µm or less.

In an embodiment, a method of forming a bearing assembly is disclosed. The method includes providing at least one superhard bearing element that has not been worn-in during operation of a bearing apparatus including the at least one superhard bearing element. The at least one superhard bearing element includes a superhard bearing surface. The method further includes providing a support ring that is configured to support the at least one superhard bearing element. The method also includes polishing the superhard bearing surface of the at least one superhard bearing element to exhibit a polished surface exhibiting an arithmetic average of absolute values ("$R_a$") surface finish of about 0.25 µm or less. The method includes securing the at least one superhard bearing element to the support ring.

In an embodiment, a method of forming a bearing assembly is disclosed. The method includes providing at least one superhard bearing element. The at least one superhard bearing element includes a superhard material. The at least one superhard bearing element also includes a superhard bearing surface. The method further includes providing a support ring that is configured to support the at least one superhard bearing element. The method also includes forming a plurality of raised surface features in at least a portion of the superhard bearing surface of the at least one superhard bearing element to provide a textured surface. The plurality of raised surface features exhibiting an average depth of about 50 µm or less. The method additionally includes securing the at least one superhard bearing element to the support ring.

Features from any of the disclosed embodiments may be used in combination with one another, without limitation. In addition, other features and advantages of the present disclosure will become apparent to those of ordinary skill in the art through consideration of the following detailed description and the accompanying drawings.

DETAILED DESCRIPTION

Embodiments of the invention relate to bearing assemblies and methods of forming bearing assemblies that include at least one superhard bearing element having a superhard bearing surface. The superhard bearing surface may include an at least partially polished surface finish and/or a textured surface that wears-in relatively faster compared to an un-textured surface. The superhard bearing surface having an at least partially polished surface finish may exhibit a relatively lower coefficient of friction when in contact with a surface (e.g., another bearing surface) than a superhard bearing surface having a relatively rough surface (e.g., a surface roughness of about 0.5 µm or greater in $R_a$). The superhard bearing surface having a textured surface wears or breaks in more rapidly than a superhard bearing surface having a non-textured surface. A worn-in superhard bearing surface exhibits a lower coefficient of friction when in contact with another bearing surface when compared to a non-worn-in superhard bearing surface. A bearing assembly including at least one superhard bearing surface exhibiting a relatively low coefficient of friction may exhibit one or more of a higher initial load capacity, generates less heat when operated, requires less torque to rotate at a given speed, or decreases the likelihood that the at least one superhard bearing surface will chip during operation compared to a bearing assembly that does not include the at least one superhard bearing surface exhibiting a low coefficient of friction.

Figure 1A:
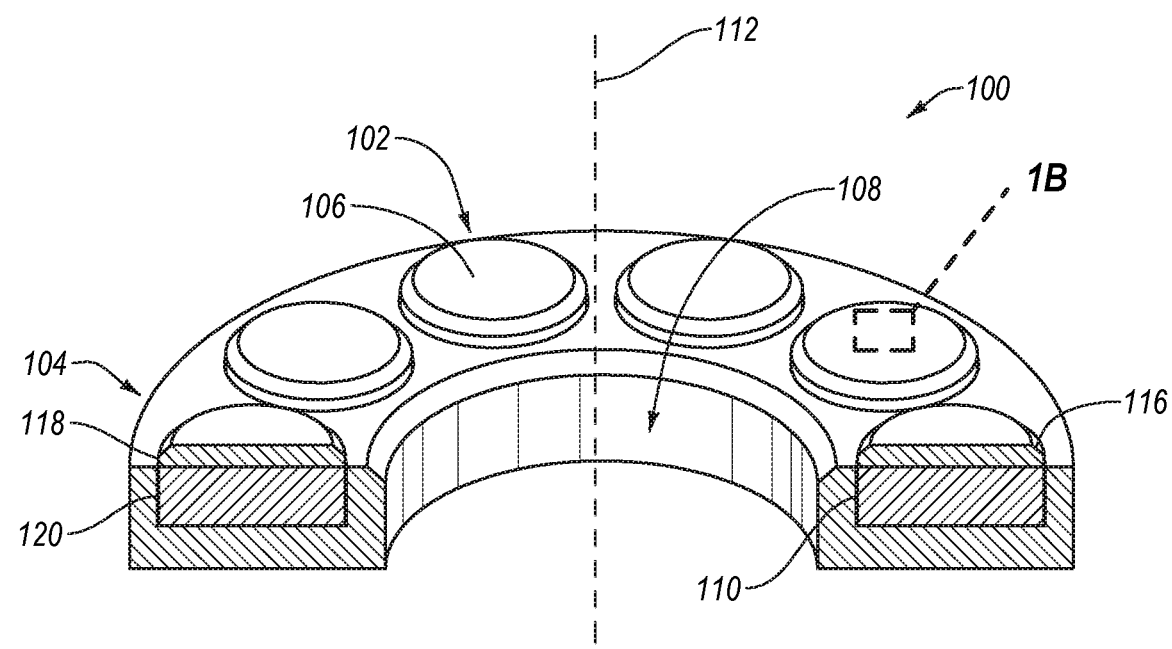
FIG. 1A is an isometric cutaway view of a thrust-bearing assembly including a collective superhard bearing surface having a relatively rough surface, according to an embodiment.

FIGS. 1A-1E illustrate a thrust-bearing assembly 100 including a plurality of superhard bearing surfaces 106, each of which includes an at least partially polished surface finish and a method of forming the thrust-bearing assembly 100, according to an embodiment. Referring to FIG. 1A, the thrust-bearing assembly 100 includes a plurality of sliding superhard bearing elements 102 that may be secured to the support ring 104. Each of the plurality of sliding superhard bearing elements 102 includes a superhard bearing surface 106 having a relatively rough surface. The superhard bearing surfaces 106 may collectively form a collective superhard bearing surface of the thrust-bearing assembly 100 having a relatively rough surface. The collective superhard bearing surface may be polished to form a collective superhard bearing surface having an at least partially polished surface finish (e.g., at least some of or each of the superhard bearing surfaces 106 is at least partially polished to exhibit a polished surface finish). The collective superhard bearing surface having an at least partially polished surface finish may exhibit a relatively lower coefficient of friction compared to the collective superhard bearing surface having a relatively rough surface.

The thrust-bearing assembly 100 may form a stator or a rotor of a thrust-bearing apparatus. The support ring 104 defines an opening 108 through which a shaft (not shown), for example, a downhole drilling motor may extend through the opening 108. The support ring 104 may be formed from a variety of different materials. For example, the support ring 104 may include a metal, alloy steel, a metal alloy, carbon steel, stainless steel, tungsten carbide, another suitable metal, a conductive material, a non-conductive material, or combinations thereof. The support ring 104 may include a plurality of recesses 110 formed therein. The plurality of recesses 110 may be distributed circumferentially about a thrust axis 112 along which a thrust force may be generally directed during use.

Each of the sliding superhard bearing elements 102 includes one of the superhard bearing surfaces 106 having a relatively rough surface. In an embodiment, each of the plurality of sliding superhard bearing elements 102 may be a superhard compact (e.g., a polycrystalline diamond compact ("PDC")) that includes a superhard table 118 bonded to a substrate 120. In an embodiment, the superhard table 118 may be omitted and the sliding superhard bearing elements 102 may comprise or be made from a superhard material, such as tungsten carbide. The term "superhard" means a material having a hardness at least equal to a hardness of tungsten carbide. Each of the plurality of sliding superhard bearing elements 102 may have a generally cylindrical shaped body or any other suitable shaped body.

Each of the plurality of sliding superhard bearing elements 102 may be partially disposed in a corresponding one of the recesses 110 of the support ring 104 and at least partially secured therein via brazing, press-fitting, threadly attaching, fastening with a fastener, another suitable technique, or combinations of the foregoing. The plurality of sliding superhard bearing elements 102 may be secured to the support ring 104 such that each of the superhard bearing surfaces 106 having relatively rough surfaces are substantially planar. In an embodiment, one or more of the plurality of sliding superhard bearing elements 102 may exhibit a peripherally extending edge chamfer 116. However, in other embodiments, the edge chamfer 116 may be omitted.

Figure 1B:
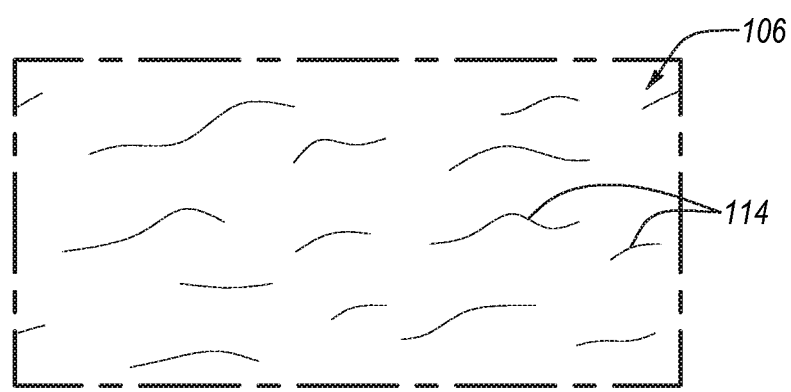
FIG. 1B is an enlarged plan view of a superhard bearing surface of a superhard bearing element having a relatively rough surface taken from box 1B of FIG. 1A.

FIG. 1B is an enlarged view of one of the superhard bearing surfaces 106 having the relatively rough surface taken from box 1B of FIG. 1A. The superhard bearing surface 106 having the relatively rough surface may include a plurality of irregularities 114. The irregularities 114 may include peaks, valleys, contours, ridges, other surface features, or combinations thereof. The irregularities 114 may be formed, for example, while manufacturing of the sliding superhard bearing elements 102. The irregularities 114 may cause the superhard bearing surface 106 to exhibit a relatively high coefficient of friction. A relatively high coefficient of friction is, for example, a static or kinetic coefficient of friction that a superhard bearing surface having a relatively rough surface exhibits when in contact with another surface that is greater than a static or kinetic coefficient of friction that a superhard bearing surface having an at least partially polished surface finish exhibits when in contact with such another surface. The surface finish may be measured, for example, by a profilometer by an arithmetic average of absolute values ("$R_a$") analysis. It should be noted that any of the surface roughness values disclosed herein are in $R_a$. In an embodiment, the superhard bearing surface 106 having a relatively rough surface may exhibit an $R_a$ surface finish of about 0.5 μm or greater.

The relatively high coefficient of friction of the superhard bearing surfaces 106 having a relatively rough surface may cause the collective superhard bearing surface formed from such superhard bearing surfaces 106 of all of the sliding superhard bearing elements 102 to exhibit a high coefficient of friction. A thrust-bearing apparatus including the collective superhard bearing surface having a relatively rough surface may cause one or more of the thrust-bearing apparatus to generate additional heat during operation, decrease the load capacity of the thrust-bearing apparatus, require more torque to rotate the thrust-bearing assembly 100 relative to the another thrust-bearing assembly (or vice versa), and/or increase the likelihood that the collective superhard bearing surface or the opposing bearing surface to chip or crack during operation. The relatively high coefficient of friction of the collective superhard bearing surface having the relatively rough surface of the thrust-bearing assembly 100 may decrease after the collective superhard bearing surface wears-in during operation. However, the collective superhard bearing surface may take between about 20 hours to about 200 hours of operation to wear-in. In some embodiments, the thrust force or the speed of rotation may cause the collective superhard bearing surface to require more than 200 hours to wear-in.

In some applications, the relatively high coefficient of friction of the collective superhard bearing surface having a relatively rough surface may be disadvantageous. For example, the thrust-bearing assembly 100 may be used in a measure while drilling device ("MWD"). The MWD may be used in a downhole drilling motor to measure a characteristic of the wellbore. The MWD may generate power from drilling mud that rotates the thrust-bearing assembly 100. The high friction of the collective superhard bearing surface having a relatively rough surface may require relatively significant amounts of torque to rotate the thrust-bearing assembly 100, thereby limiting the power generation. In another example, the thrust-bearing assembly 100 may be used in a thrust-bearing apparatus that generates excessive heat. The high friction of the collective relatively rough superhard bearing surface may be a significant source of heat. In another example, the thrust-bearing assembly 100 may be used in a thrust-bearing apparatus that rotates at low speeds and/or is exposed to a low thrust-force. The low rotation speed and/or low thrust-force may cause to the thrust-bearing assembly 100 to wear-in after about 200 hours or more, if at all. In some embodiments, the high friction of the collective superhard bearing surface may be required to be worn-in prior to use in the MWD.

In an embodiment, at least a portion of the collective superhard bearing surface having a relatively rough surface may be polished prior to using the thrust-bearing assembly 100 in operation. The collective superhard bearing surface may be polished using any suitable method. In an embodiment, the collective superhard bearing surface having a relatively rough surface may be polished using at least one of a grinding, lapping, or polishing process ("polishing process"). For example, the collective superhard bearing surface may be positioned to contact a wheel (e.g., a polishing pad, a lapping plate, etc.). A force may be applied to the thrust-bearing assembly 100 to press the collective superhard bearing surface against the wheel. The wheel may include abrasive particles (e.g., a superhard material that is the same as or different from the superhard bearing element) embedded therein or the abrasive particles may be exposed to the wheel (e.g., a polishing paste or slurry). The abrasive particles may exhibit an average particle size greater than about 40 μm, about 20 μm to about 40 μm, about 5 μm to about 20 μm, about 1 μm to about 5 μm, or less than about 3 μm. During the polishing process, the wheel may rotate relative to the collective superhard bearing surface. The rotating wheel may remove material from at least some of the superhard bearing surfaces 106 to form the collective superhard bearing surface having at least a portion of which exhibiting a polished surface finish (i.e., at least one of the plurality of sliding superhard bearing elements 102 includes a superhard bearing surface 106 having a polished surface finish).

In another embodiment, the collective superhard bearing surface having a relatively rough surface may be polished using a chemical-assisted polishing process. For example, during the polishing process, a wheel may rotate relative to the collective superhard bearing, while chemical slurry is applied to the wheel. The chemical slurry may cause a chemical reaction that enables the wheel to more efficiently remove portions of each superhard bearing surface 106. For example, if the superhard bearing surface 106 includes diamond, the chemical slurry may include potassium hydroxide, potassium persulfate, potassium permanganate, potassium nitrate, or combinations thereof.

In an embodiment, the collective superhard bearing surface having an at least partially polished surface finish may include contaminants introduced during the polishing process. For example, the collective superhard bearing surface having the at least partially polished surface finish may include a plurality of abrasive particles embedded therein. Additionally, if a lubricant media, cooling media, and/or chemical slurry were used during the polishing process, portions of the lubricant media, cooling media, and/or chemical slurry may remain on or in the plurality of sliding superhard bearing elements 102. For example, the sliding superhard bearing elements 102 may include polycrystalline diamond having a plurality of interstitial regions therein (e.g., an at least partially leached polycrystalline diamond). In such an embodiment, the lubricant media, cooling media, and/or chemical slurry may at least partially occupy portions of the interstitial regions of the polycrystalline diamond.

In an embodiment, the polishing process may polish the collective superhard bearing surface having a relatively rough surface at about room temperature (e.g., about 30° C.). For example, the polishing process may include a dry polishing process. For example, such a dry polishing process may be configured to maintain the thrust-bearing assembly 100 at about room temperature. In an embodiment, a dry polishing process may include rotating a wheel relative to the collective superhard bearing surface having a relatively rough surface without applying lubricating and/or cooling media (e.g., a liquid, paste, or slurry) to the wheel. Optionally, the wheel and thrust-bearing assembly 100 may be maintained at about room temperature using a water chiller or other heat dispensing device. Alternatively, the polishing process may include a wet polishing process configured to maintain the sliding superhard bearing elements 102 at about room temperature. In an embodiment, a wet polishing process may include applying a lubricating and/or cooling media to the wheel. Optionally, the lubricating and/or cooling media may maintain the thrust-bearing assembly 100 at about room temperature. After polishing, the superhard bearing surfaces 106 may be substantially coplanar (e.g., completely coplanar) with each other at room temperature.

Examples of methods and equipment used to polish polycrystalline diamond tables are disclosed in U.S. Pat. Nos. 5,563,300; 5,447,208; 5,967,250; and 6,145,608 to Lund et. al., the disclosure of each of which is incorporated herein, in its entirety, by this reference.

In an embodiment, a polishing process may polish the collective superhard bearing surface having a relatively rough surface of the thrust-bearing assembly 100 at temperatures greater than about room temperature (e.g. greater than about 30° C.). For example, a polishing process may include a wet or dry polishing process that is not configured to maintain the thrust-bearing assembly 100 at about room temperature. For instance, the collective superhard bearing surface may include a polycrystalline diamond bearing surface. The collective superhard bearing surface may contact an iron-bonded diamond wheel, a cobalt-bonded diamond wheel, a bronze-bonded diamond wheel, or another suitable wheel. The polishing process may heat the thrust-bearing assembly 100 to temperatures greater than about 30° C. The high temperature may polish the collective superhard bearing surface using thermo-chemical reactions such as graphitization, oxidation, and diffusion. Such a collective superhard bearing surface may include additional amounts of graphite (after polishing) compared to a collective superhard bearing surface polished using another polishing process. After polishing, the superhard bearing surfaces 106 may be substantially coplanar with each other (e.g., at a temperature greater than about room temperature).

In an embodiment, the polishing process may include a plurality of acts. For example, during a first act, the collective superhard bearing surface having a relatively rough surface may be polished using a relatively coarse abrasive particles (e.g., an average particle size greater than about 40 μm), while the wheel rotates at high speeds (e.g., greater than about 200 rpm). After the first act, the collective superhard bearing surface may have a coarse polished surface finish. In a second act, the collective superhard bearing surface may be polished using more fine abrasive particles (e.g., an average particle size of about 20 μm to about 5 μm) and/or lower rotation speed (e.g., less than about 200 rpm). After the second act, the collective superhard bearing surface may have a finer polished surface finish. The polishing process may include additional acts to further polish the collective superhard bearing surface. The additional acts may include finer abrasive particles and/or lower rotation speeds.

In an embodiment, the collective superhard bearing surface having a relatively rough surface may be polished by rotating the thrust-bearing assembly 100 against another surface. For example, the collective superhard bearing surface may be positioned to contact another surface. The another surface may include the bearing surface of another thrust-bearing assembly. For example, the thrust-bearing assembly 100 may be rotated relative the another surface, or vice versa. The thrust-bearing assembly 100 may be rotated relative the another surface until the collective superhard bearing surface exhibits a polished surface finish. In an embodiment, the thrust-bearing assembly 100 may be rotated relative to the another surface in the presence of a liquid, such as a lubricant.

In an embodiment, the collective superhard bearing surface having a relatively rough surface may be polished using a machining process. Machining processes that may form the collective superhard bearing surface having a polished surface finish may include electrical discharge machining ("EDM") such as wire EDM and plunge EDM, milling, or lasing. For example, the machining process may substantially simultaneously machine the whole collective superhard bearing surface, more than one superhard bearing surfaces 106, or may machine each superhard bearing surface 106 individually. In some embodiments, the machining process may form a superhard bearing surface 106 having a polished surface finish exhibiting a mirror surface finish (e.g., an $R_a$ surface finish of about 0.05 μm or less).

In an embodiment, each superhard bearing surface 106 having a relatively rough surface may be polished to form a superhard bearing surface having a partially polished surface finish. Such a superhard bearing surface 106 may include a portion exhibiting a relatively rough surface and a portion exhibiting a polished surface finish. In other words, the polished surface finish may not uniformly cover the superhard bearing surface 106. As such, the superhard bearing surface having a partially polished surface finish may include a surface finish that varies with location. The superhard bearing surface having a partially polished surface finish may collectively form a collective superhard bearing surface having a partially polished surface finish. In an embodiment, the thrust-bearing assembly 100 may warp or deform at operating temperatures to form a concave collective superhard bearing surface. In such an embodiment, the portions of the collective superhard bearing surface at certain positions may be polished. In an embodiment, the collective superhard bearing surface may be partially polished to reduce more prominent irregularities 114 of the collective superhard bearing surface.

Figure 1C:
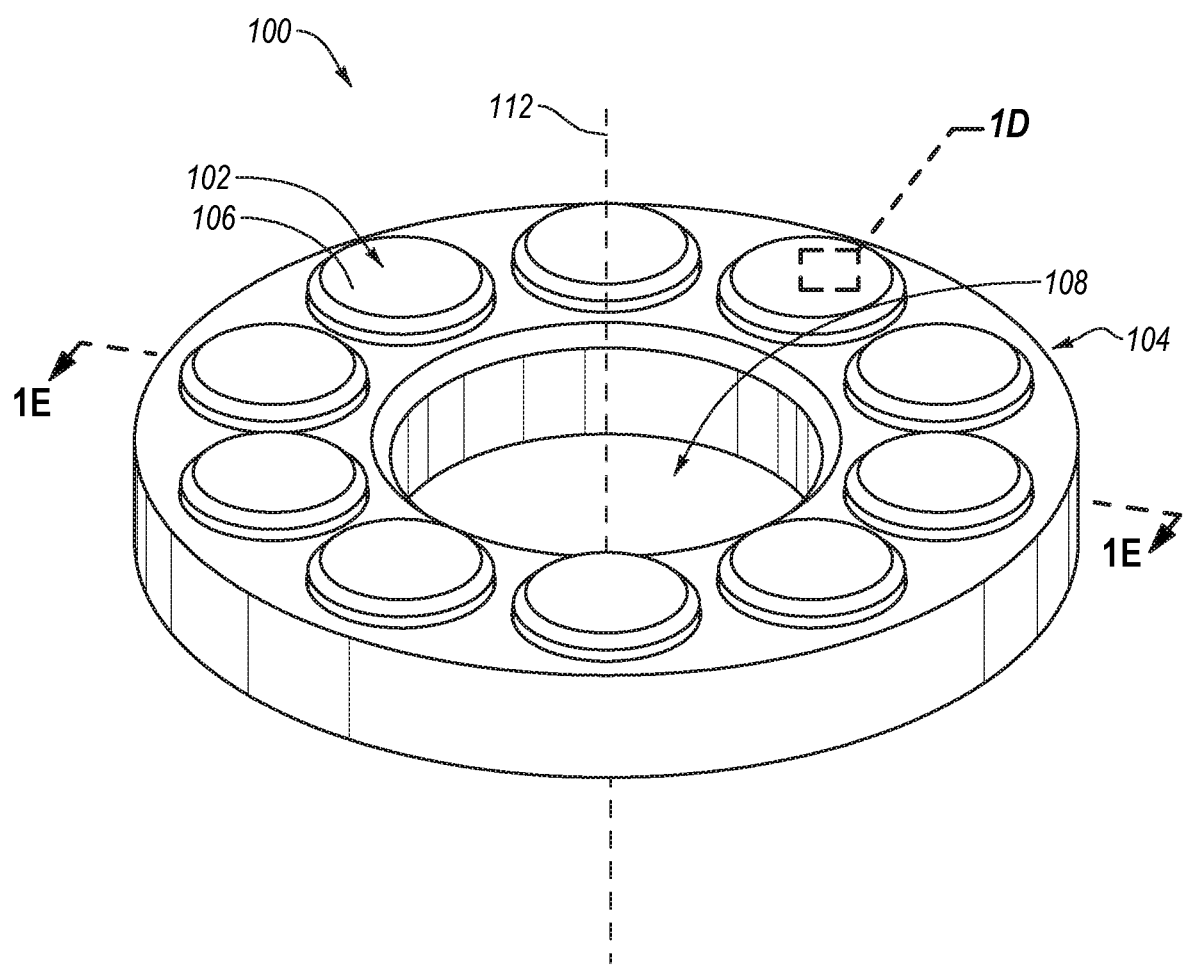
FIG. 1C is an isometric view of the thrust-bearing assembly after polishing, according to an embodiment.
Figure 1D:
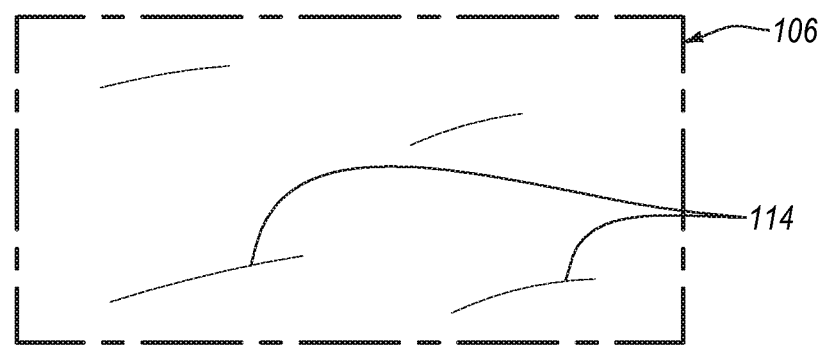
FIG. 1D is an enlarged plan view of a superhard bearing surface of a superhard bearing element having an at least partially polished surface finish taken from box 1D of FIG. 1C.

FIG. 1C is an isometric view of the thrust-bearing assembly 100 after polishing, according to an embodiment. After polishing, the superhard bearing surface 106 of at least some of or each of the plurality of sliding superhard bearing elements 102 may exhibit an at least partially polished surface finish exhibiting a relatively low coefficient of friction compared to prior to being polished. FIG. 1D is an enlarged view of a superhard bearing surface 106 having a polished surface finish taken from box 1D of FIG. 1C. FIG. 1D illustrates that the number of irregularities 114 and prominence of each irregularity 114 on the superhard bearing surface 106 having the polished surface finish is decreased after polishing. As such, each superhard bearing surface 106 and the collective polished superhard bearing element may exhibit a relatively low coefficient of friction. A low coefficient of friction is defined as a static or kinetic coefficient of friction that a superhard bearing surface having a polished surface finish exhibits when in contact with another surface (e.g., a substantially similar superhard bearing surface having a polished surface finish) that is less than a static or kinetic coefficient of friction that a superhard bearing surface having a relatively rough surface exhibits when in contact with the another surface.

In an embodiment, each superhard bearing surface 106 may exhibit an $R_a$ surface finish of about 0.25 µm or less, and in particular, about 0.05 µm or less. For example, each superhard bearing surface 106 may exhibit a polished surface finish (in $R_a$) of about 0.20 µm or less, about 0.15 µm or less, about 0.13 µm or less, about 0.10 µm or less, about 0.050 µm or less, about 0.025 µm or less, about 0.013 µm or less, about 0.0025 µm or less, about 0.0013 µm or less, or about 0.00025 µm or less. In another embodiment, the superhard bearing surface 106 may include a surface finish (in $R_a$) of about 0.05 µm to about 0.25 µm, about 0.025 µm to about 0.25 µm, about 0.0025 µm to about 0.050 µm, about 0.0013 µm to about 0.0025 µm, about 0.00025 µm to about 0.0025 µm, about 0.00025 µm to about 0.0013 µm, or about 0.13 µm to about 0.013 µm. In another embodiment, the superhard bearing surface 106 may exhibit a mirror surface finish (e.g., 0.05 µm $R_a$). The surface finish may be measured, for example, by a profilometer (e.g., by $R_a$). The surface finish may be selected based on the expected load the thrust-bearing assembly 100 will carry, the rate of rotation of the thrust-bearing assembly 100, the type and pressure of fluid (e.g., drilling mud) that flows through the thrust-bearing assembly 100, the expected torque that may be applied to the thrust-bearing assembly 100, other performance criteria, or combinations thereof.

Each of the superhard bearing surfaces 106 may exhibit a coefficient of friction that is at least partially dependent on the polished surface finish of the superhard bearing surface 106. In an embodiment, each of the superhard bearing surfaces 106 having the polished surface finish may exhibit a coefficient of friction (e.g., static or kinetic coefficient of friction) of about 0.020 or less when the superhard bearing surface 106 contacts a substantially similar superhard bearing surface. In particular, the superhard bearing surface 106 may exhibit a coefficient of friction of about 0.015 or less, or about 0.010 or less. The collective superhard bearing surface having a polished surface finish may exhibit such ranges of low coefficients of friction.

Figure 1E:
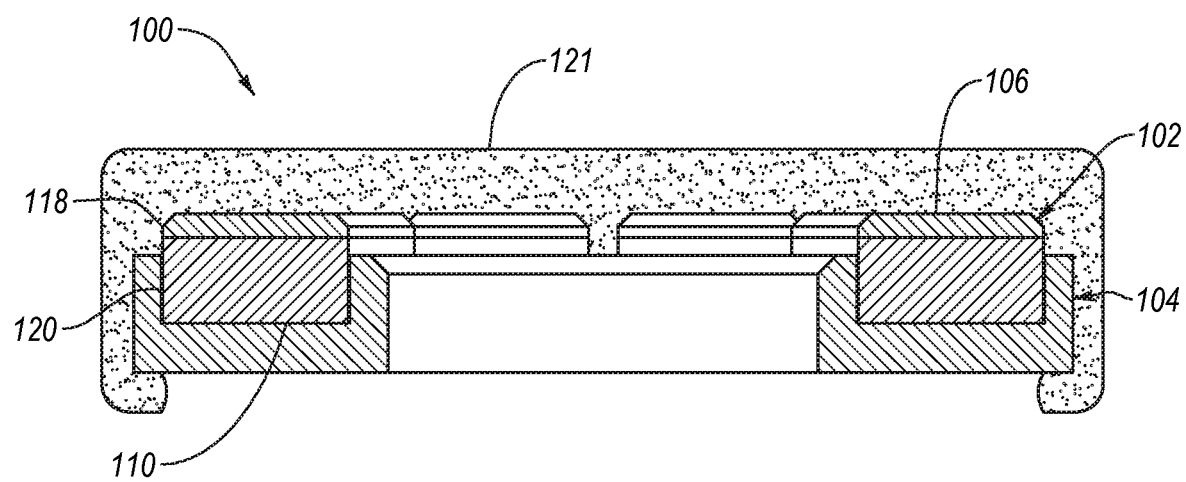
FIG. 1E is a cross-sectional view of the thrust-bearing assembly shown in FIG. 1C taken along line 1E-1E, according to an embodiment

FIG. 1E is a cross-sectional view of the thrust-bearing assembly 100 shown in FIG. 1C taken along line 1E-1E, according to an embodiment. Some methods of polishing the collective superhard bearing surface may result in a collective superhard bearing surface having a polished surface finish that is substantially planar. In an embodiment, the collective superhard bearing surface having the polished surface finish may only be substantially planar around a specific temperature since the thrust-bearing assembly 100 may slightly warp at temperatures greater than room temperature. As such, the collective superhard bearing surface may only be substantially planar at the temperature around the temperature that the collective superhard surface was polished. For example, the superhard bearing surface 106 may be polished at about room temperature (e.g., about 30° C.) or polished at another temperature below room temperature (e.g., less than about 25° C. or less than about 30° C.). As such, the collective superhard bearing surface 106 is planar at about room temperature. Alternatively, the superhard bearing surface 106 may be polished at temperatures greater than about room temperature (e.g., at an expected temperature of the bearing assembly during use).

A thrust-bearing apparatus may include the thrust-bearing assembly 100 including the collective superhard bearing surface having the polished surface finish. The thrust-bearing apparatus may include a second thrust-bearing assembly including a second bearing surface. The low coefficient of friction of the collective superhard bearing surface having a polished surface finish may cause the thrust-bearing apparatus to generate less heat during operation, may increase the load capacity of the thrust-bearing apparatus, may require less torque to rotate the thrust-bearing assembly 100 relative to the second thrust-bearing assembly (or vice versa), and/or may decrease the likelihood that the collective superhard bearing surface chips or cracks during operation.

With reference to FIG. 1E, after forming the collective polished superhard bearing surface, the thrust-bearing assembly 100 may be packaged with at least one packaging material 121. The thrust-bearing assembly 100 is packaged prior to being installed and used in operation. Packing the thrust-bearing assembly 100 may include at least partially enclosing the support ring 104 and at least one of the plurality of sliding superhard bearing elements 102 in the at least one packaging material 121. The at least one packaging material 121 may be configured to prevent the superhard bearing surface 106 having the polished surface finish from contacting another surface (e.g., another superhard material) or other structure and may be configured to contact the superhard bearing surface 106 without damaging the superhard bearing surface 106. The packaging material 121 may include paper, bubble wrap, polystyrene foam, paperboard, straw, other suitable packaging materials, or combinations thereof. The thrust-bearing assembly 100 that is at least partially enclosed in the packaging material 121 may be placed in a shipping container and shipped. The shipping container may include a box, crate, envelope, or other suitable shipping container.

Figure 4A:
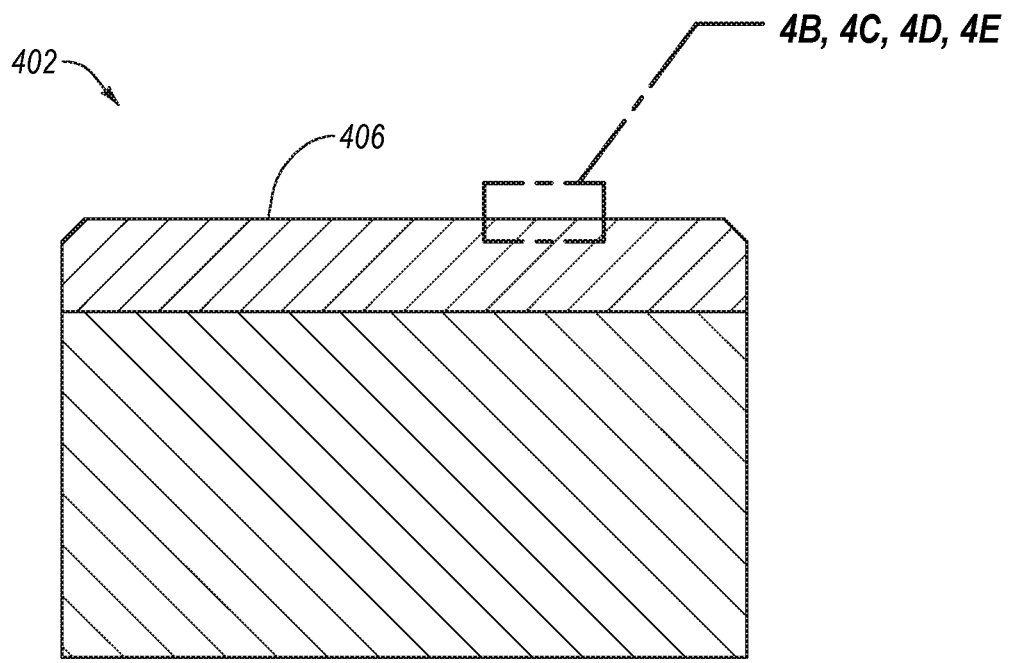
FIG. 4A is a cross-sectional view of a sliding superhard bearing element including a superhard bearing surface, according to an embodiment.
Figure 4B:
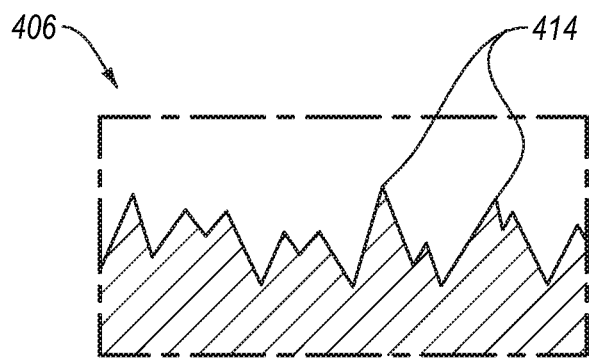
FIG. 4B is an enlarged view of the superhard bearing surface having a relatively rough surface taken from box 4B of FIG. 4A.
Figure 4C:
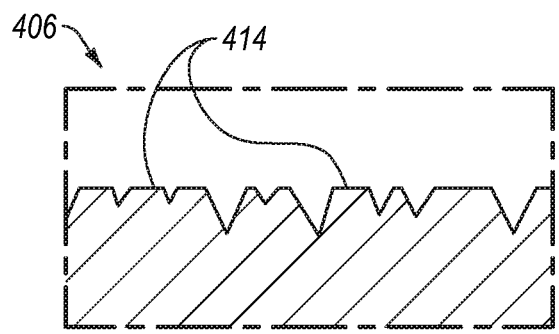
FIG. 4C is an enlarged view of the superhard bearing surface having an at least partially polished surface finish taken from box 4C of FIG. 4A.

In any of the embodiments disclosed herein, the superhard bearing elements (e.g., the sliding superhard bearing elements 102, the substantially continuous superhard bearing element 436 shown in FIG. 4A, or the superhard bearing elements of the tilting pad 440 shown in FIG. 4C) may each include one or more superhard materials, such a polycrystalline diamond, polycrystalline cubic boron nitride, silicon carbide, silicon nitride, reaction bonded silicon carbide, reaction bonded silicon nitride, tungsten carbide, or any combination of the foregoing superhard materials. For example, the superhard table 118 may include polycrystalline diamond and the substrate 120 may include cobalt-cemented tungsten carbide. Furthermore, in any of the embodiments disclosed herein, the polycrystalline diamond table may be leached to at least partially remove or substantially completely remove a catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached to otherwise remove to a selected depth from a bearing surface. Moreover, in any of the embodiments disclosed herein, the polycrystalline diamond may be unleached and include a catalyst therein that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials and/or structures from which the superhard bearing elements may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard table 118 in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 40 μm, 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size of about 1 μm to about 4 μm. In some embodiments, the diamond particles may comprise three or more different sizes (e.g., one relatively larger size and two or more relatively smaller sizes), without limitation. The resulting polycrystalline diamond formed form HPHT sintering the aforementioned diamond particles may also exhibit the same or similar diamond grain size distributions and/or size as the aforementioned diamond particles distributions and particle sizes. Additionally, in any of the embodiments disclosed herein, the sliding superhard bearing elements 102 may be free-standing (e.g., substrate less) and formed from a polycrystalline diamond body that is at least partially or fully leached to remove a metal-solvent catalyst initially used to sinter the polycrystalline diamond body.

FIGS. 2A-2D illustrate a bearing element 202 including a superhard bearing surface 206, according to embodiments. The thrust-bearing assembly 200 includes a plurality of sliding superhard bearing elements 202. In an embodiment, each of the plurality of sliding superhard bearing elements 202 may initially include a superhard bearing surface 206 having a relatively rough surface exhibiting a relatively high coefficient of friction. At least some of or each of the superhard bearing surfaces 206 of the plurality of sliding superhard bearing elements 202 are then polished to exhibit a superhard bearing surface 206 having an at least partially polished surface finish. The superhard bearing surface 206 having a polished surface finish may exhibit a low coefficient of friction. Before or after polishing, each of the plurality of sliding superhard bearing elements 202 may be mounted to a support ring 204 to form the thrust-bearing assembly 200. The thrust-bearing assembly 200 includes a collective superhard bearing surface having a polished surface finish formed from the superhard bearing surfaces 206. As such, the collective polished superhard bearing surface may exhibit a relatively low coefficient of friction. Compared to a thrust-bearing assembly including a collective superhard bearing surface exhibiting a relatively rough surface, the relatively low coefficient of friction of the collective superhard bearing surface having an at least partially polished surface finish may result in one or more of less heat being generated when the thrust-bearing assembly 200 is initially rotated relative to another surface (e.g., another thrust-bearing assembly), enabling the thrust-bearing assembly 200 to initially operate with a higher initial capacity, enabling rotating the thrust-bearing assembly 200 with less torque, and/or decreasing the likelihood that the collective superhard bearing chips during operation.

Figure 2A:
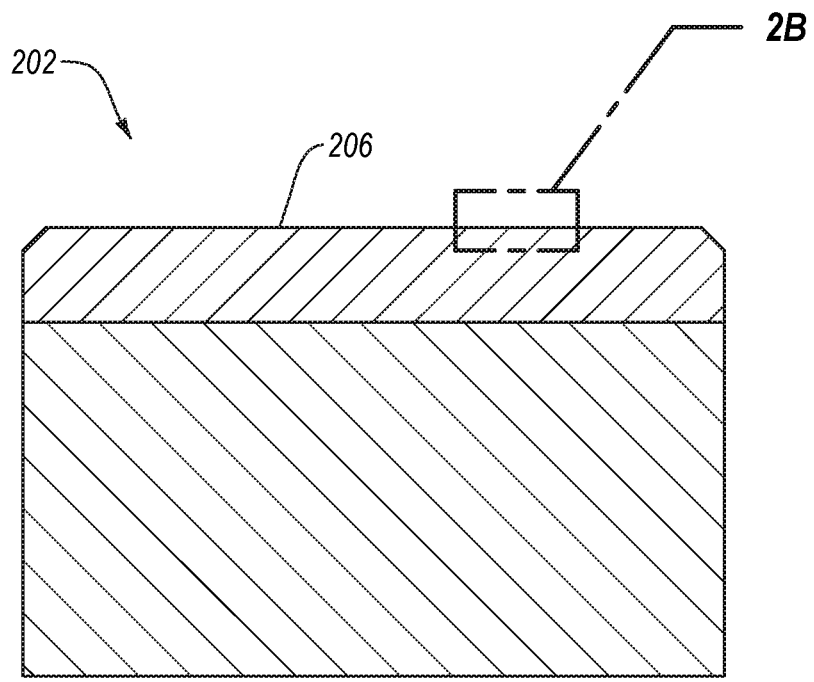
FIG. 2A is a cross-sectional view of a sliding superhard bearing element including a superhard bearing surface having a relatively rough surface, according to an embodiment.
Figure 2B:
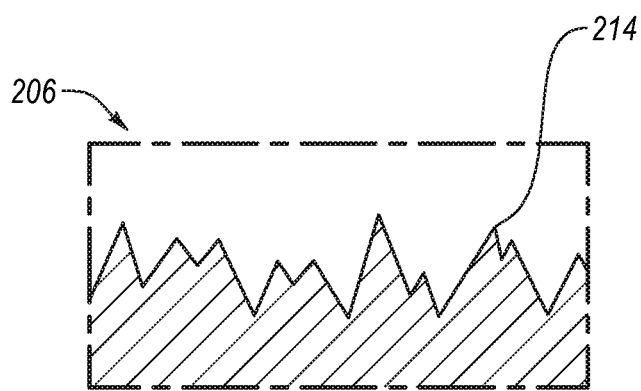
FIG. 2B is an enlarged cross-sectional view of the superhard bearing surface taken from box 2B of FIG. 2A.

FIG. 2A is a cross-sectional view of one of the sliding superhard bearing elements 202 including the superhard bearing surface 206 having a relatively rough surface, according to an embodiment. In an embodiment, the sliding superhard bearing elements 202 including the superhard bearing surface 206 having a relatively rough surface may include any of the superhard bearing elements known in the art. The sliding superhard bearing element 202 may be substantially similar to the sliding superhard bearing element 102 shown in FIG. 1A. The sliding superhard bearing element 202 may be formed of any of the superhard materials disclosed herein. FIG. 2B is an enlarged view of the superhard bearing surface 206 having a relatively rough surface taken from box 2B of FIG. 2A. Prior to polishing, the superhard bearing surface 206 having a relatively rough surface exhibits a plurality of irregularities 214. The plurality of irregularities 214 may cause the superhard bearing surface 206 to exhibit a relatively high coefficient of friction. A collective superhard bearing surface formed from a plurality of superhard bearing surfaces 206 having a relatively rough surface may exhibit a relatively high coefficient to friction.

In an embodiment, the superhard bearing surface 206 having a relatively rough surface may be polished prior to securing the sliding superhard bearing element 202 to the support ring 204. The superhard bearing surface 206 may be polished using any of the methods disclosed herein. For example, the superhard bearing surface 206 may be polished using a polishing process. In another example, the superhard bearing surface 206 may be polished using a machining process (e.g., EDM, lasing, milling). The superhard bearing surface 206 may be polished in any suitable device, such as a commercially available polycrystalline diamond lapping or grinding machines (e.g., available through Coborn Engineering Company, Limited, Romford, Essex, UK).

In an embodiment, pressure may be applied to the sliding superhard bearing element 202 during a polishing process. The pressure may at least partially determine how the superhard bearing surface 206 contacts the wheel. In an embodiment, the pressure may cause portions of the superhard bearing surface 206 to wear preferentially relative to other portions of the superhard bearing surface having a relatively rough surface. For instance, the pressure may be configured to form a superhard bearing surface 206 having a partially polished surface finish or to polish the superhard bearing surface 206 at an angle.

Figure 2C:
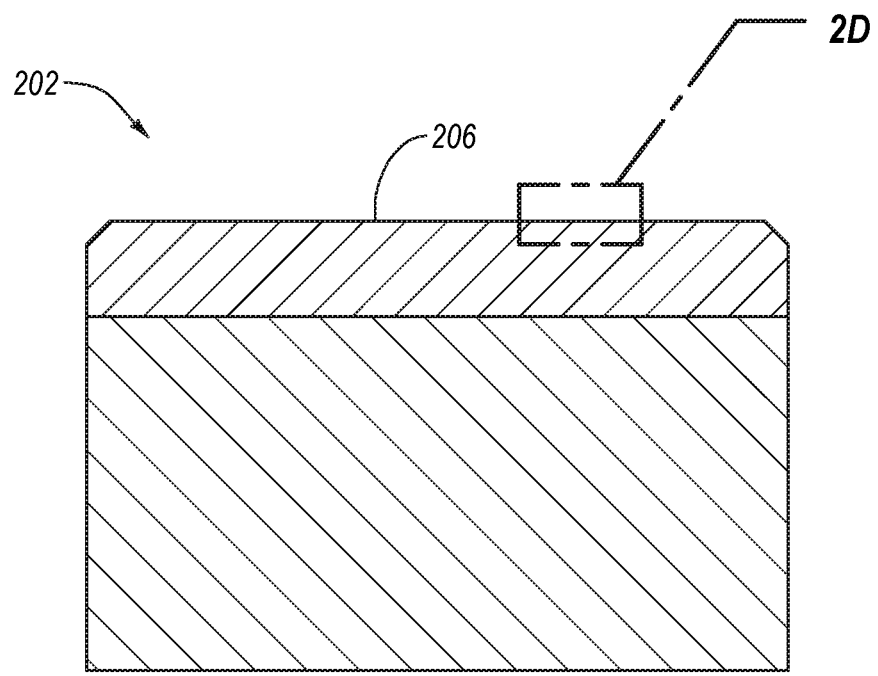
FIG. 2C is a cross-sectional view of the sliding superhard bearing element, according to an embodiment.
Figure 2D:
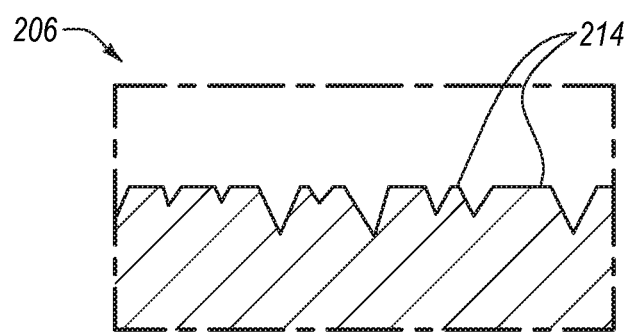
FIG. 2D is an enlarged cross-sectional view of the superhard bearing surface having an at least partially polished surface finish taken from box 2D of FIG. 2C.

FIG. 2C is a cross-sectional view of the sliding superhard bearing element 202 including the superhard bearing surface 206 having a polished surface finish, according to an embodiment. FIG. 2D is an enlarged view of the superhard bearing surface 206 taken from box 2D of FIG. 2C. The sliding superhard bearing element 202 may be substantially similar to one of the plurality of sliding superhard bearing elements 102 shown in FIG. 1C. For example, the superhard bearing surface 206 having a polished surface finish may include a plurality of irregularities 214. However, the plurality of irregularities 214 may be less prominent after polishing. In an embodiment, the superhard bearing surface 206 having a polished surface finish may exhibit a surface finish (in $R_a$) of about 0.25 μm or less. As such, the superhard bearing surface 206 may exhibit a low coefficient of friction. Additionally, the superhard bearing surface 206 may exhibit a coefficient of friction of about 0.02 or less (e.g., 0.01 or less) when the superhard bearing surface 206 contacts another substantially similar surface.

Figure 2E:
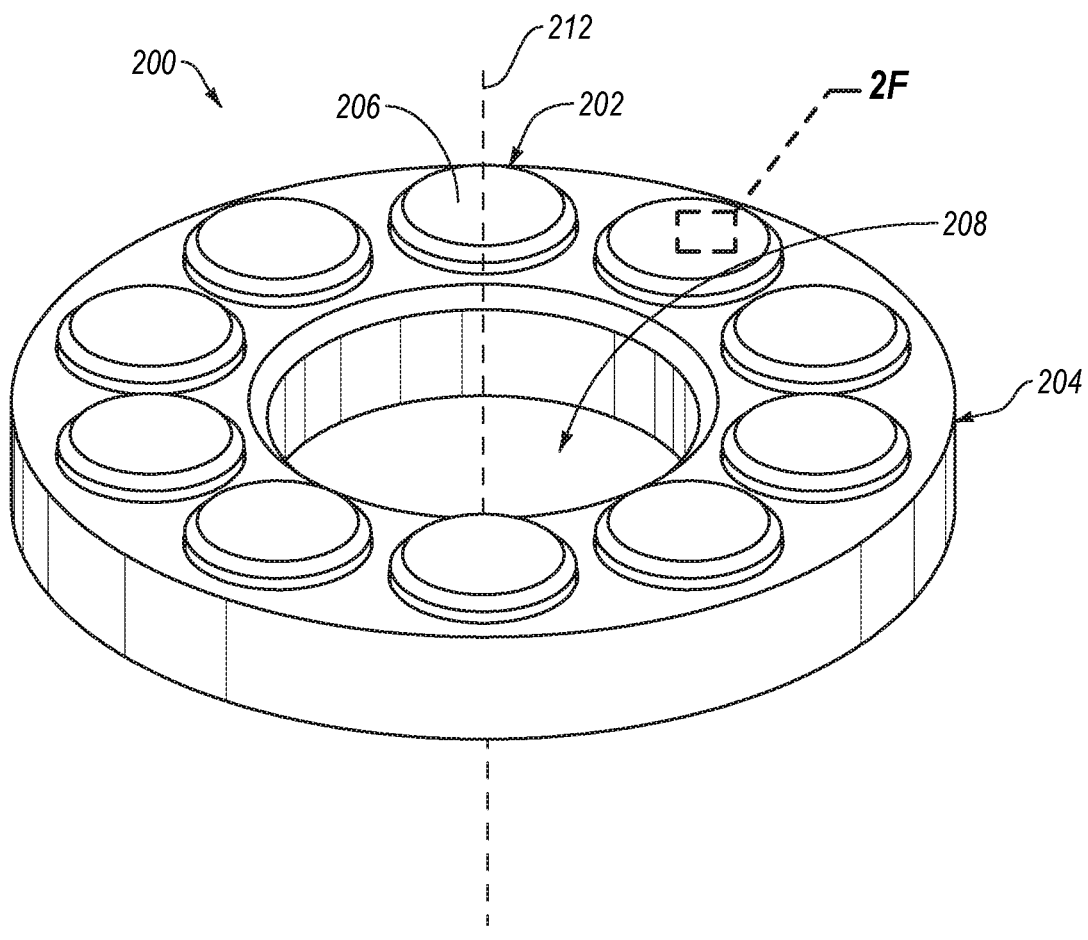
FIG. 2E is an isometric view of a thrust-bearing assembly, according to an embodiment.
Figure 2F:
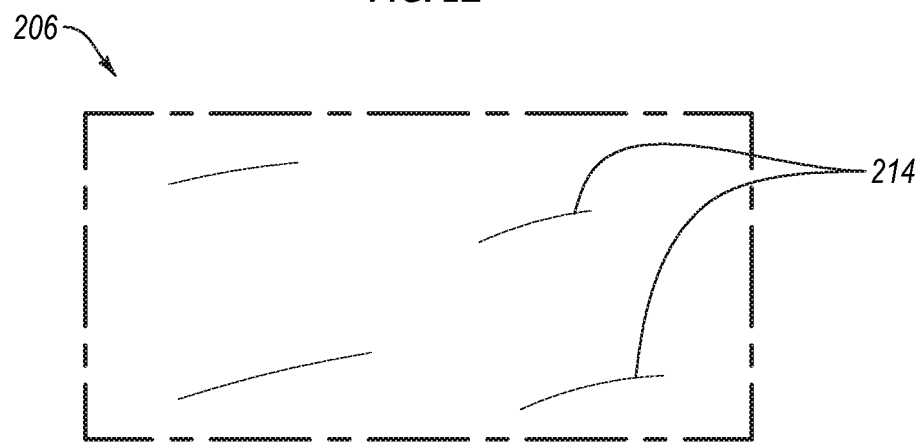
FIG. 2F is an enlarged plan view of the superhard bearing surface having an at least partially polished surface finish taken from box 2F of FIG. 2E.

FIG. 2E is an isometric view of the thrust-bearing assembly 200 including a collective superhard bearing surface having an at least partially polished surface finish, according to an embodiment. FIG. 2F is an enlarged plan view of the superhard bearing surface having a polished surface finish taken from box 2F of FIG. 2E. The thrust-bearing assembly 200 may form a stator or a rotor of a thrust-bearing apparatus. The thrust-bearing assembly 200 may include a support ring 204 that is substantially similar to the support ring 104 shown in FIG. 1A. As such, the support ring 204 may be formed of any of the support ring materials disclosed herein and may include an opening 208 configured to receive a shaft (not shown). The support ring 204 may include a plurality of recesses formed therein configured to receive a plurality of sliding superhard bearing elements 202. The plurality of recesses may be distributed circumferentially about a thrust axis 212. The thrust-bearing assembly 200 may further include a plurality of sliding superhard bearing elements 202. At least some or all of the plurality of sliding superhard bearing elements 202 may include a superhard bearing surface 206 having a polished surface finish. Each of the plurality of sliding superhard bearing elements 202 may be disposed in a corresponding one or the recesses of the support ring 204 and secured therein using any of the methods disclosed herein. The superhard bearing surfaces 206 may collectively form the collective superhard bearing surface having a polished surface finish of the thrust-bearing assembly 200. The collective superhard bearing surface may exhibit a low coefficient of friction. In an embodiment, the thrust-bearing assembly 200 may be packaged prior to being installed and used in operation.

In an embodiment, the collective superhard bearing surface may be substantially planar. In some embodiments, the collective superhard bearing surface may be planarized (e.g., lapped) and/or polished after securing the plurality of sliding superhard bearing elements 202 to the support ring 204 such that the collective superhard bearing surface is substantially planar and the superhard bearing surfaces 106 are substantially coplanar with each other.

FIGS. 3A-3F illustrate a thrust-bearing assembly 300 including a collective superhard bearing surface having a textured surface and a method of forming the thrust-bearing assembly 300, according to an embodiment. The thrust-bearing assembly 300 may include a plurality of sliding superhard bearing elements 302. Each of the plurality of sliding superhard bearing elements 302 may include a superhard bearing surface 306 having a relatively rough surface. The superhard bearing surface 306 may be machined to include a plurality of raised surface features 322 to form a superhard bearing surface 306 having a textured surface. After machining, a thrust-bearing assembly 300 may be formed by securing each of the plurality of sliding superhard bearing elements 302 to a support ring 304. The superhard bearing surface 306 having a textured surface may collectively form a collective superhard bearing surface having a textured surface. The plurality of raised surface features 322 may enable the collective superhard bearing surface to wear-in more rapidly than if the collective superhard bearing surface did not include the plurality of raised surface features 322 because less superhard material needs to be worn away. As such, the plurality of raised surface features 322 may enable the collective superhard bearing surface to more quickly decrease its coefficient of friction during operation.

Figure 3A:
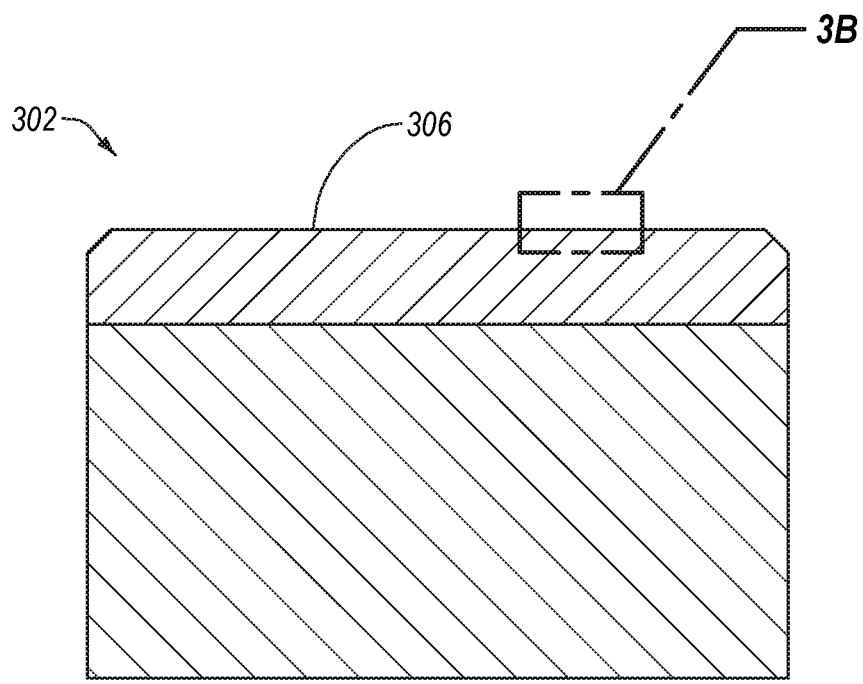
FIG. 3A is a cross-sectional view of a sliding superhard bearing element including a superhard bearing surface having a relatively rough surface, according to an embodiment.
Figure 3B:
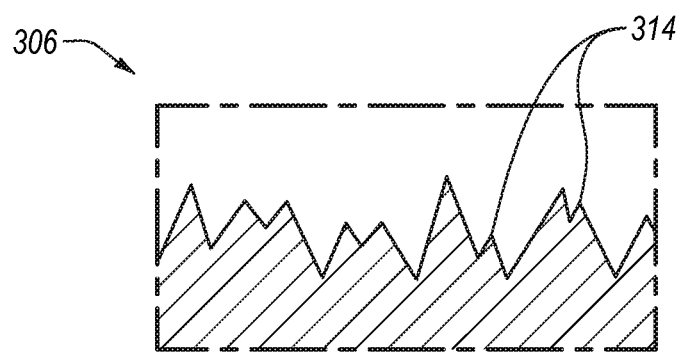
FIG. 3B is an enlarged cross-sectional view of the superhard bearing surface having a relatively rough surface taken from box 3B shown in FIG. 3A.

FIG. 3A illustrates a cross-sectional view of one of the sliding superhard bearing elements 302 including the superhard bearing surface 306 having a relatively rough surface, according to an embodiment. The sliding superhard bearing element 302 may be substantially similar to the sliding superhard bearing element 202 shown in FIG. 2A. For example, the sliding superhard bearing element 302 may be formed of any of the superhard materials disclosed herein. FIG. 3B is an enlarged view of the superhard bearing surface 306 having a relatively rough surface taken from box 3B of FIG. 3A. The superhard bearing surface 306 may include a plurality of irregularities 314 that may cause the superhard bearing surface to exhibit a high coefficient of friction. The presence of the plurality of irregularities 314 may inhibit or prevent a thrust-bearing assembly 300 from rapidly wearing-in.

In an embodiment, the superhard bearing surface 306 having a relatively rough surface may be machined to include a plurality of raised surface features 322 prior to attaching the sliding superhard bearing element 302 to the support ring 304. The plurality of raised surface features 322 may be formed using any suitable method. In an embodiment, the plurality of raised surface features 322 may be formed using one or more of the following machining processes: EDM process, milling process, a laser cutting process, or plasma cutting process configured to form the raised surface features 322. For example, in an embodiment, the plurality of raised surface features 322 may be formed by directing a laser beam at the superhard bearing surface 306 to selectively remove portions of the superhard bearing surface 306 and form the plurality of raised surface features 322. The laser beam may form the textured surface by ablating, vaporizing, or otherwise removing material from the superhard bearing surface 306.

Figure 3C:
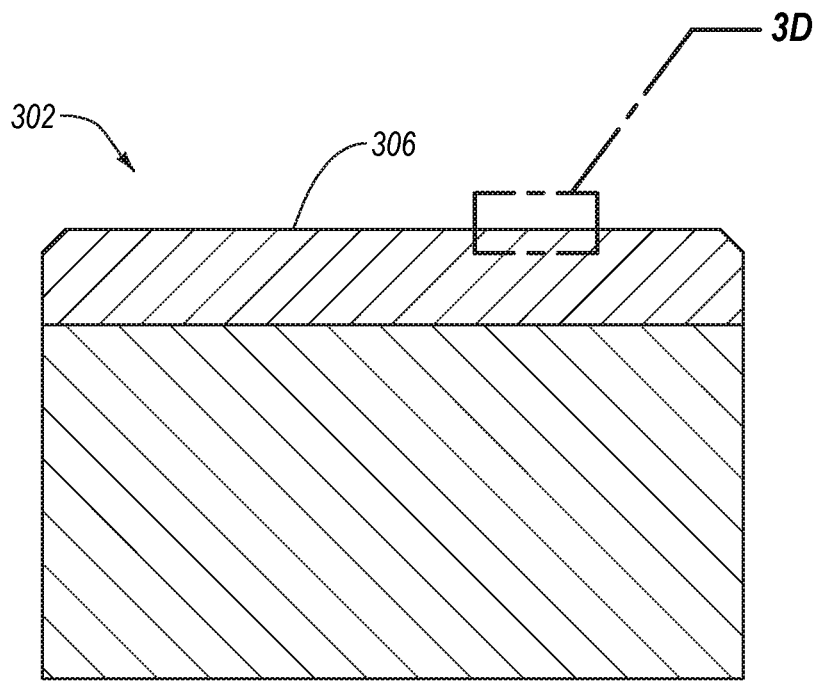
FIG. 3C is a cross-sectional view of the sliding superhard bearing element including a superhard bearing surface having a textured surface, according to an embodiment.
Figure 3D:
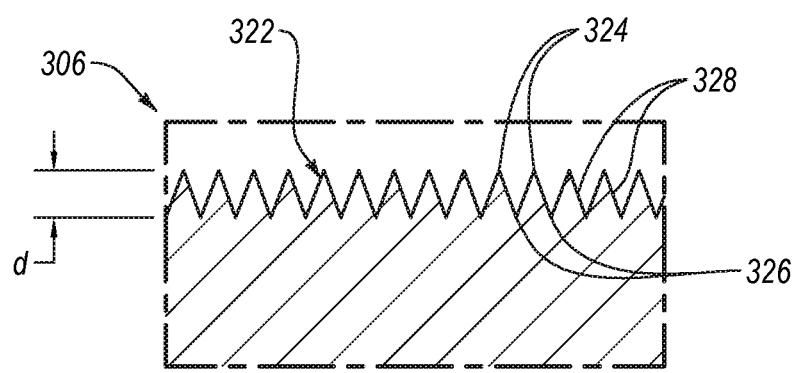
FIG. 3D is an enlarged cross-sectional view of the superhard bearing surface having a textured surface taken from box 3D of FIG. 3C.

FIG. 3C is a cross-sectional view of one of the sliding superhard bearing elements 302 including the superhard bearing surface 306 having an at least partially textured surface, according to an embodiment. FIG. 3D is an enlarged view of the superhard bearing surface 306 taken from box 3D of FIG. 3C. Each of the plurality of raised surface features 322 includes at least an upper portion 324, a bottom portion 326, and an intermediate portion 328 extending between the upper portion 324 and the bottom portion 326. The superhard bearing surface 306 may be partially formed from the upper portions 324. In some embodiments, the plurality of raised surface features 322 may cause the superhard bearing surface 306 to exhibit a higher coefficient of friction than the superhard bearing surface 306 having a relatively rough surface. However, the upper portion 324 may exhibit a relatively low coefficient of friction more rapidly than the superhard bearing surface 306 having a relatively rough surface. As such, the superhard bearing surface 306 having a textured surface may exhibit a lower coefficient of friction after a period of operation than the superhard bearing surface 306 having a relatively rough surface. In an embodiment, the superhard bearing surface 306 having the textured surface may exhibit a coefficient of friction that is substantially similar or lower than the superhard bearing surface 306 having a relatively rough surface, after an identical duration of use.

The plurality of raised surface features 322 may exhibit an average depth "d." The average depth "d" may be the average distance between the upper portion 324 and the bottom portion 326. In an embodiment, the average depth "d" may be greater than about 50 µm. In an embodiment, the average depth "d" may be less than about 50 µm, such as less than about 45 µm, less than about 35 µm, less than about 25 µm, less than about 10 µm, less than about 5.0 µm, less than about 1.0 µm, less than about 0.50 µm, or less than about 0.10 µm. In another embodiment, the average depth "d" may be about 0.050 µm to about 35 µm, such as about 0.10 µm to about 1.0 µm, about 0.40 µm to about 1.0 µm, about 1.0 µm to about 10 µm, about 5.0 µm to about 25 µm, or about 10 µm to about 35 µm. The average depth "d" may be selected based on one or more of the surface finish of the superhard bearing surface 306 before the raised surface features 322 are formed therein (e.g., the superhard bearing surface 306 exhibits a surface finish greater than about 0.5 µm, a surface finish of about 0.25 µm to about 0.5 µm, or a surface finish less than about 0.25 µm), the expected thrust load, the expected rate of rotation, the desired coefficient of friction before operation, or the desired coefficient of friction after a period of operation. For example, the average depth "d" may be relatively large (e.g., about 10 µm to about 35 µm) if the superhard bearing surface 306 has a relatively rough surface. In an embodiment, the average depth "d" may be relatively small (e.g., less than about 10 µm) if the expected thrust load or the expected rate of rotation is relatively low.

The plurality of raised surface features 322 may exhibit a number of geometries. In an embodiment, the plurality of raised surface features 322 may exhibit a generally triangular, rectangular, semi-circular, irregular, or other suitable cross-sectional geometry. For example, the upper portion 324 and the bottom portion 326 may exhibit a substantially angular cross-section, a substantially circular cross-section, a generally pointed cross-section, a substantially flat cross-section, or a substantially irregular cross-section. In an embodiment, the intermediate portion 328 may extend from the upper portion 324 to the bottom portion 326 in a substantially straight path, tapered path, curved path (e.g., concave or convex), stepped path, irregular path, or combinations thereof. The geometry of the plurality of raised surface features 322 may be selected based on the machining technique used to form the plurality of raised surface features 322, and the wear characteristics of the plurality of raised surface features 322. For example, the upper portion 324 may exhibit a substantially angular cross-sectional geometry if the superhard bearing surface 306 is configured to wear-in rapidly after operation. Alternatively, for example, the upper portion 324 may exhibit a substantially flat cross-sectional geometry if superhard bearing surface 306 exhibits a relatively low coefficient of friction prior to operation.

Figure 3E:
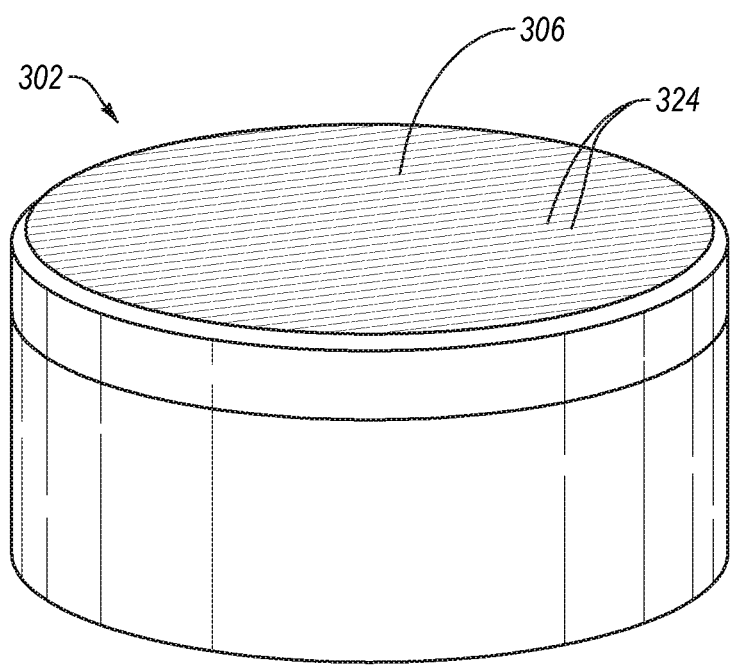
FIG. 3E is an isometric view of the sliding superhard bearing element including a including a superhard bearing surface having a textured surface, according to an embodiment.

FIG. 3E is an isometric view of one of the sliding superhard bearing elements 302 including a textured surface, according to an embodiment. The plurality of raised surface features 322 may include any number of topographies. For example, the plurality of raised surface features 322 may be arranged in a plurality of lines, rings, intersecting lines, or any other suitable topography.

In an embodiment, the superhard bearing surface 306 having a textured surface may include a plurality of raised surface features 322 that are substantially uniform. For example, FIG. 3E shows the superhard bearing surface 306 having a plurality of raised surface features 322 arranged in a plurality of uniform parallel lines. In another example, FIG. 3D shows that the superhard bearing surface 306 exhibits a substantially uniform depth "d." In other embodiments, the superhard bearing surface 306 may include a plurality of raised surface features 322 that are substantially non-uniform. The non-uniform plurality of raised surface features 322 may exhibit an average depth "d", a geometry, or topography that varies with location on the superhard bearing surface 306. For example, portions of the superhard bearing surface 306 that are configured to wear-in more rapidly may exhibit a greater average depth "d" or a plurality of intersecting lines. In another example, the superhard bearing surface 306 may be machined to exhibit a partially textured surface. In another example, each of the plurality of raised surface features 322 may exhibit a depth "d" that is different on one side of the raised surface feature 322 than the other side.

Figure 3F:
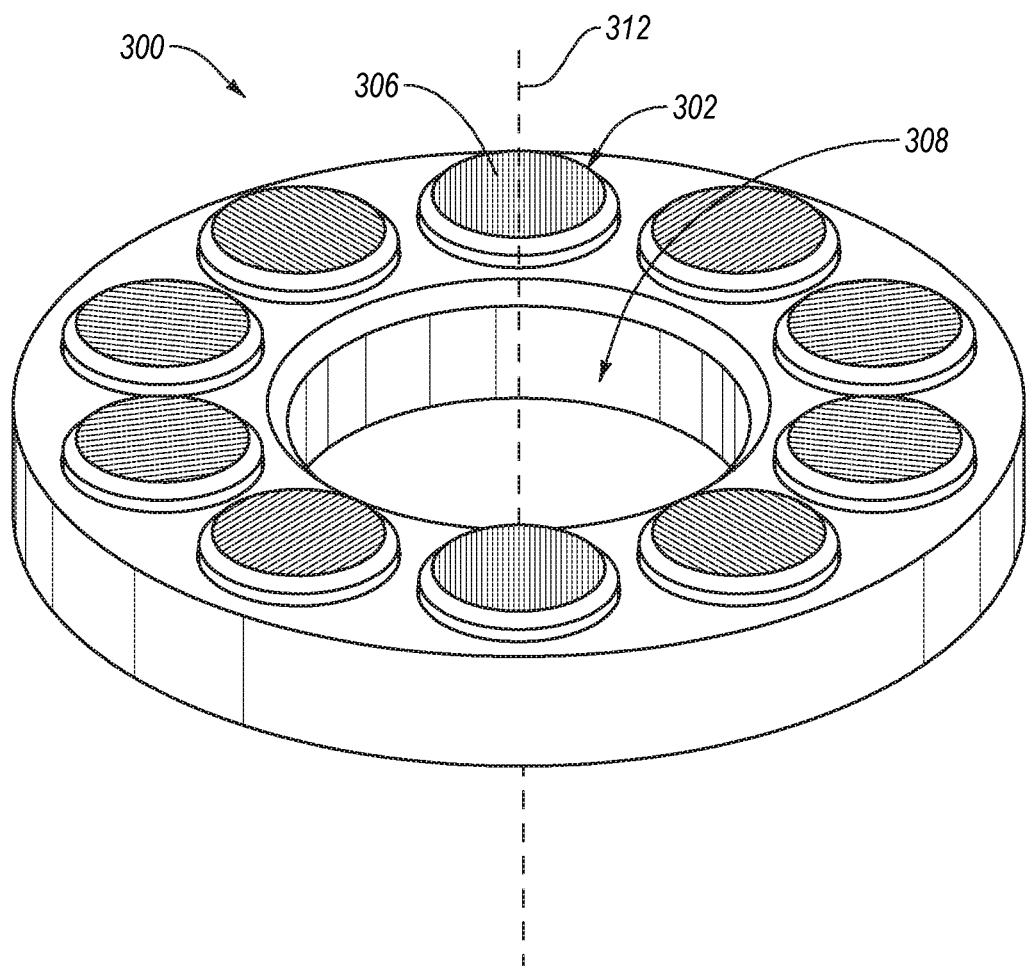
FIG. 3F is an isometric view of a thrust-bearing assembly including a collective superhard bearing surface having a textured surface, according to an embodiment.

FIG. 3F is an isometric view of the thrust-bearing assembly 300 including a collective superhard bearing surface having a textured surface, according to an embodiment. The thrust-bearing assembly 300 may form a stator or a rotor of a thrust-bearing apparatus. The thrust-bearing assembly 300 may include a support ring 304 that is substantially similar to the support ring 104 show in FIG. 1A. As such, the support ring 304 may be formed of any of the support materials disclosed herein and may include an opening 308 configured to receive a shaft (not shown). The support ring 304 may include a plurality of recesses each of which is configured to receive one of a plurality of the sliding superhard bearing elements 302. The plurality of recesses may be distributed circumferentially about a thrust axis 312.

The sliding superhard bearing elements 302 may include the superhard bearing surface 306 having the textured surface. Each of the plurality of sliding superhard bearing elements 302 may be disposed in a corresponding one or the recesses of the support ring 304 and secured therein using any of the methods disclosed herein. The superhard bearing surfaces 306 may collectively form a collective superhard bearing surface having a textured surface. The collective superhard bearing surface having a textured surface may wear-in rapidly compared to a collective surface formed from a plurality of superhard bearing surface having a relatively rough surface. In an embodiment, the collective superhard bearing surface having the textured surface may include one or more superhard bearing surfaces 306 having a textured surface and one or more superhard bearing surfaces 306 having a relatively rough surface. In an embodiment, the plurality of superhard bearing surfaces 306 may be machined to include a textured surface after the plurality of sliding superhard bearing elements 302 are secured to the support ring 304. In an embodiment, the thrust-bearing assembly 300 is packaged prior to being installed and used in operation using any one or more of the packaging materials disclosed herein. In an embodiment, the superhard bearing surface 306 may have a plurality of texture features 322 formed on a portion thereon.

In an embodiment, the collective superhard bearing surface having the textured surface of the thrust-bearing assembly 300 may be worn-in against second bearing surface of a second thrust-bearing assembly (e.g., another superhard bearing surface having a textured surface) prior to using the thrust-bearing assembly 300 in operation. Wearing-in the thrust-bearing assembly 300 against the second thrust-bearing assembly may cause the collective superhard bearing surface of the thrust-bearing assembly 300 to substantially match (e.g., conform to, operate more efficiently with) the second superhard bearing surface of the second thrust-bearing assembly.

FIGS. 4A-4E schematically illustrate a sliding superhard bearing element 402 including a superhard bearing surface 406 that exhibits a polished and textured surface and a method of forming the polished and textured surface (not to scale). FIG. 4A is a cross-sectional view of a sliding superhard bearing element 402 including a superhard bearing surface 406, according to an embodiment. The sliding superhard bearing element 402 may be substantially similar to the sliding superhard bearing element 202 shown in FIG. 2A. For example, the sliding superhard bearing element 402 may be formed of any of the superhard materials disclosed herein. Initially, the superhard bearing surface 406 can exhibit a relatively rough surface. FIG. 4B is an enlarged view of the superhard bearing surface 406 having the relatively rough surface taken from box 4B of FIG. 4A. The superhard bearing surface 406 may include a plurality of irregularities 414 that may cause the superhard bearing surface 406 to exhibit a relatively high coefficient of friction. The presence of the plurality of irregularities 414 may inhibit or prevent the superhard bearing surface 406 from rapidly wearing-in and may prevent the superhard bearing surface 406 from exhibiting a relatively low coefficient of friction.

In an embodiment, the superhard bearing surface 406 exhibiting the relatively rough surface may be polished to exhibit an at least partially polished surface finish. The superhard bearing surface 406 may be polished using any method disclosed therein. FIG. 4C is an enlarged view of the superhard bearing surface 406 having the polished surface finish taken from box 4C of FIG. 4A. The superhard bearing surface 406 having the at least partially polished surface finish may still include a plurality of irregularities 414. However, the plurality of irregularities 414 may be less prominent after polishing. In an embodiment, the superhard bearing surface 406 may be polished to exhibit a relatively fine polished surface finish of about 0.25 µm or less in $R_a$. In another embodiment, the superhard bearing surface 406 may be polished to exhibit an $R_a$ surface finish greater than about 0.25 µm, such as about 1 µm to about 35 µm. Polishing the superhard bearing surface 406 to exhibit such an at least partially polished surface finish may require less polishing than the relatively fine polished surface.

Figure 4D:
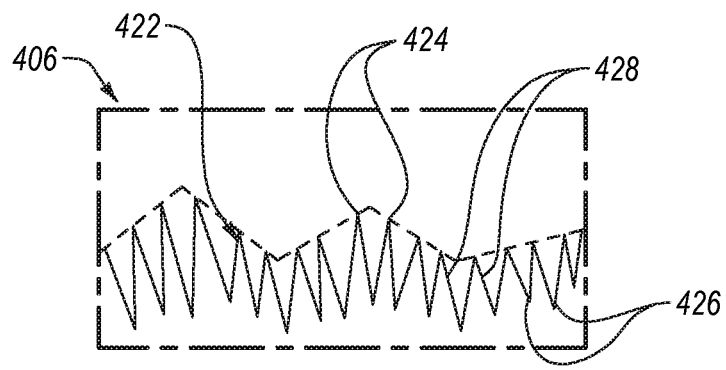
FIG. 4D is an enlarged view of the superhard bearing surface having an at least partially textured surface taken from box 4D of FIG. 4A.

In an embodiment, the superhard bearing surface 406 having the at least partially polished surface finish may be machined to include a plurality of raised surface features 422 thereon. The plurality of raised surface features 422 may be formed using any method disclosed herein. FIG. 4D is an enlarged view of the superhard bearing surface 406 having an at least partially textured surface taken from box 4D of FIG. 4A (not to scale). Each of the plurality of raised surface features 422 includes at least an upper portion 424, a bottom portion 426, and an intermediate portion 428 extending between the upper portion 424 and the bottom portion 426. The plurality of raised surface features 422 may be configured to polish and/or wear-in relatively rapidly. Polishing the superhard bearing surface 406 prior to forming the plurality of raised surface features 422 may enable smaller (e.g., exhibiting a smaller average depth) raised surface features 422 to be machined into the superhard bearing surface 406, enable the plurality of raised surface features 422 to be more uniformly formed across the superhard bearing surface 406, enable each of the upper portions 424 of the plurality of raised surface features 422 to form a generally planar bearing surface, permit the plurality of raised surface features 422 to be formed more quickly, and/or remove more prominent irregularities 414 prior to forming the plurality of raised surface features 422.

Figure 4E:
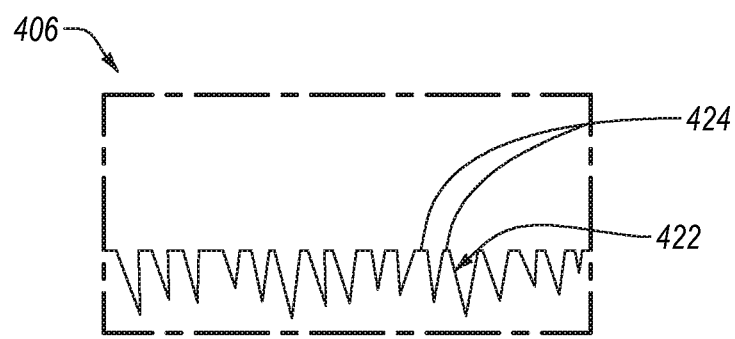
FIG. 4E is an enlarged view of the superhard bearing surface having an at least partially polished surface finish taken from box 4E of FIG. 4A.

In another embodiment, the superhard bearing surface 406 having the textured surface may be further polished. The superhard bearing surface 406 having a textured surface may be polished using any polishing technique disclosed herein. FIG. 4E is an enlarged view of the superhard bearing surface 406 having an at least partially polished surface finish taken from box 4E of FIG. 4A. In an embodiment, the superhard bearing surface 406 may be polished until each of the plurality of raised surface features 422 are substantially removed. In such an embodiment, the polished superhard bearing surface may exhibit an $R_a$ surface finish of about 0.25 µm or less. In another embodiment, the superhard bearing surface 406 may still include the plurality of raised surface features 422 after the superhard bearing surface 406 is polished. In such an embodiment, the superhard bearing surface 406 may be polished until the plurality of raised surface features 422 exhibit a selected average depth, until the superhard bearing surface exhibits a selected surface finish (e.g., a polished finish), and/or until each of the upper portions 424 of the plurality of raised surface features 422 form a substantially planar bearing surface. Forming a plurality of raised surface features 422 before polishing may enable quicker or improved (e.g., less variation or less $R_a$ surface finish measurements) polishing of the superhard bearing surface 406 and/or enable the superhard bearing surface 406 to wear-in relatively rapidly during use.

In an embodiment, the superhard bearing surface 406 of the sliding superhard bearing element 402 may be polished, machined (e.g., to form a plurality of raised surface features 422), and further polished before the sliding superhard bearing element 402 is mounted to a support ring (not shown). In another embodiment, the superhard bearing surface 406 of the sliding superhard bearing element 402 may be polished, lapped, and/or machined, and further polished after the sliding superhard bearing element is mounted to a support ring. In another embodiment, the superhard bearing surface 406 of the sliding superhard bearing element 402 may be polished and/or lapped and/or machined before the sliding superhard bearing element 402 is mounted to a support ring and then machined and/or polished after the sliding superhard bearing element 402 is mounted to the support ring.

In an embodiment, the superhard bearing surface 406 of the sliding superhard bearing element 402 may be polished one or more times and machined one or more times, in any order. For example, the superhard bearing surface 406 may be polished and then lapped and/or machined. In another example, the superhard bearing surface 406 may be machined and then polished. In another embodiment, a portion of the superhard bearing surface 406 may be polished while another portion of the superhard bearing surface 406 may be lapped and/or machined. For example, portions of the superhard bearing surface 406 configured to initially contact another bearing surface may be polished. The remaining portions of the superhard bearing surface 406 may be lapped and/to have a plurality of raised surface features 422 formed thereon.

Figure 5:
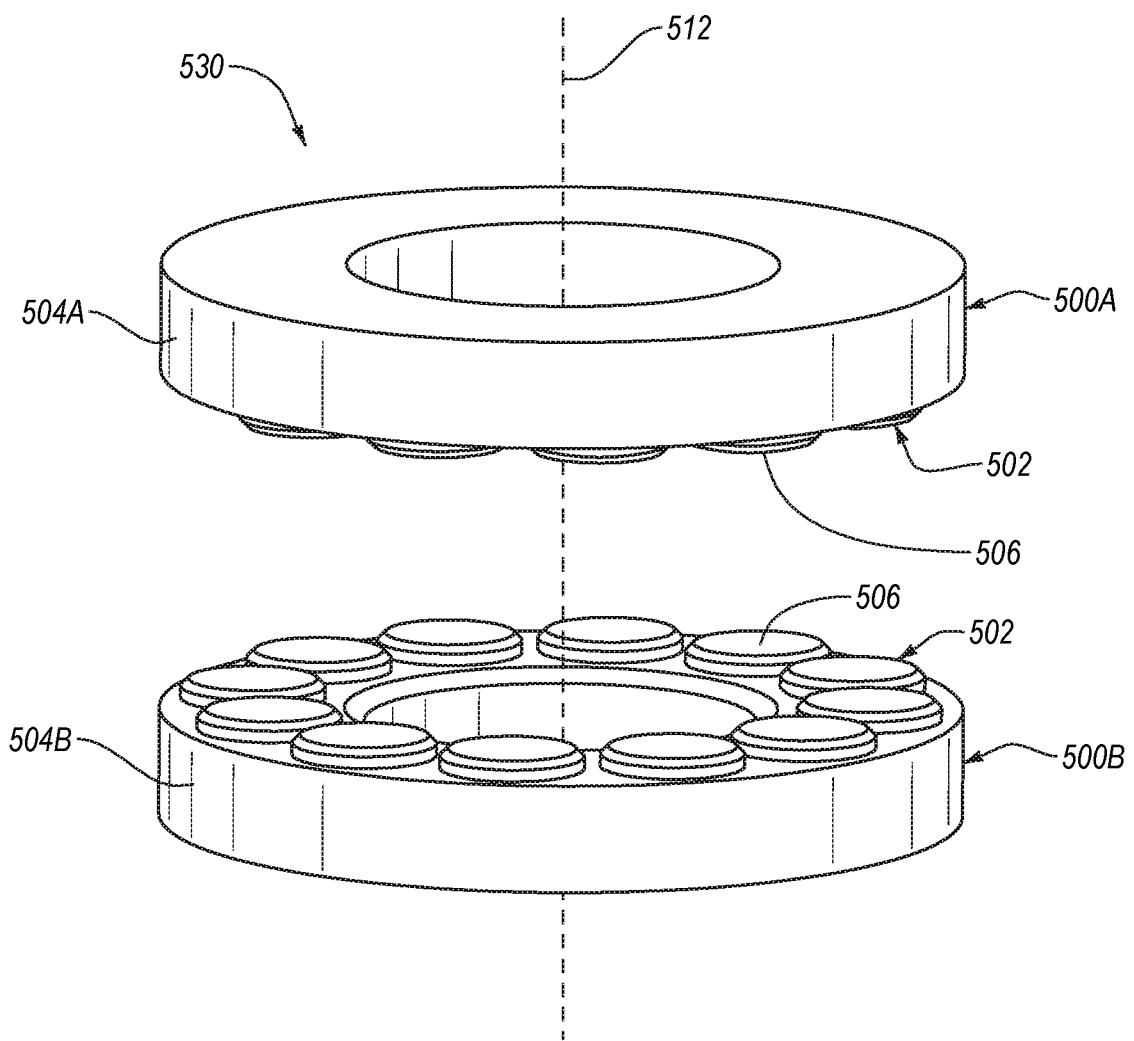
FIG. 5 is an isometric view of a thrust-bearing apparatus that includes a first thrust-bearing assembly and a second thrust-bearing assembly, according to an embodiment.

FIG. 5 is an isometric view of a thrust-bearing apparatus 530 that includes a first thrust-bearing assembly 500A and a second thrust-bearing assembly 500B, according to an embodiment. The first thrust-bearing assembly 500A may form either a stator or a rotor while the second thrust-bearing assembly 500B may form the other of the stator or the rotor. The first thrust-bearing assembly 500A and/or the second thrust-bearing assembly 500B may be substantially similar to any of the thrust-bearing assemblies disclosed herein (e.g., the thrust-bearing assembly 100, 200, or 300 shown in FIG. 1C, 2E, or 3F, respectively). For example, the first thrust-bearing assembly 500A may include a first support ring 504A and the second thrust-bearing assembly 500B may include a second support ring 504B. The first support ring 504A and the second support ring 504B may be formed of any of the support ring materials disclosed herein. In one embodiment, the first support ring 504A and/or the second support ring 504B may include a plurality of recesses (not shown) distributed circumferentially about an axis 512. Each of the plurality of recesses may be configured to receive a plurality of sliding superhard bearing elements 502.

The first thrust-bearing assembly 500A and/or the second thrust-bearing assembly 500B also includes a plurality of sliding superhard bearing elements 502. Each of the plurality of sliding superhard bearing elements 502 may be at least partially positioned in and mounted to a recess of the first support ring 504A or the second support ring 504B using any method disclosed herein. Each of the plurality of sliding superhard bearing elements 502 can be formed from any of the superhard materials disclosed herein. Each of the superhard bearing elements 502 can include a superhard bearing surface 506. Initially, the superhard bearing surface 506 of each of the plurality of sliding superhard bearing elements 502 may include a relatively rough surface.

In an embodiment, at least some of the relatively rough surfaces of the plurality of sliding superhard bearing elements 502 may be at least partially polished to form a superhard bearing surface 506 having a polished surface finish (e.g., an $R_a$ surface finish of about 0.25 μm or less). For example, the first thrust-bearing assembly 500A, the second thrust-bearing assembly, or both can include one or more superhard bearing surfaces 506 having an at least partially polished surface. In an embodiment, each of the superhard bearing surfaces 506 may be polished before each sliding superhard bearing element 502 is mounted to a support ring (e.g., the first support ring 504 A or the second support ring 504B). Alternatively, the superhard bearing surfaces 506 may be polished after the plurality of sliding superhard bearing elements 502 are secured to a support ring. In an embodiment, the first thrust-bearing assembly 500A and the second thrust-bearing assembly 500B may both include collective superhard bearing surfaces having a polished surface finish. In such an embodiment, the coefficient of friction between the collective superhard bearing surfaces of the first thrust-bearing assembly 500A and the second thrust-bearing assembly 500B may be about 0.020 or less.

In another embodiment, at least some of the relatively rough superhard bearing surfaces of the plurality of sliding superhard bearing elements 502 may include a superhard bearing surface 506 having a plurality of raised surface features (not shown) machined thereon. For example, the first thrust-bearing assembly 500A, the second thrust-bearing assembly 500B, or both can include one or more superhard bearing surfaces 506 having a plurality of raised surface features machined thereon. The plurality of raised surface features may be configured to enable the superhard bearing surfaces 506 of the plurality of sliding superhard bearing elements 502 to wear-in relatively rapidly. The plurality of raised surface features may exhibit any average depth "d", cross-sectional shape, or geometry disclosed herein as shown in FIGS. 3D to 4E (not to scale). The plurality of raised surface features may be machined into at least some of the superhard bearing surfaces 506 of the plurality of sliding superhard bearing elements 502 before or after the plurality of superhard bearing elements 506 are mounted to a support ring (e.g., the first support ring 504A or the second support ring 504B).

In an embodiment, both the first thrust-bearing assembly 500A and the second thrust-bearing assembly 500B may include at least one superhard bearing surface 506 exhibiting an at least partially polished surface finish. In another embodiment, both the first thrust-bearing assembly 500A and the second thrust-bearing assembly 500B may include at least one superhard bearing surface 506 exhibiting a plurality of raised surface features machined thereon. In another embodiment, the first thrust-bearing assembly 500A may include at least one superhard bearing surface 506 exhibiting an at least partially polished surface finish and the second thrust-bearing assembly 500B may include at least one superhard bearing surface 506 exhibiting a plurality of raised surface features machined thereon. In another embodiment, at least one of the first thrust-bearing assembly 500A or the second thrust-bearing assembly 500B may at least one superhard bearing surface 506 exhibiting an at least partially polished and textured bearing surface. In another embodiment, at least one of the first thrust-bearing assembly 500A or the second thrust-bearing assembly 500B may include at least one superhard bearing surface 506 exhibiting an at least partially polished and/or textured bearing surface. In another embodiment, at least one of the first thrust-bearing assembly 500A or the second thrust-bearing assembly includes an at least partially polished and/or textured superhard bearing surface 506, while the other assembly includes at least one relatively rough superhard bearing surface 506

FIGS. 6A-6E illustrate a thrust-bearing apparatus 630 that includes a first thrust-bearing assembly 632 and a second thrust-bearing assembly 634. The first thrust-bearing assembly 632 may form either a stator or a rotor while the second thrust-bearing assembly 634 may form the other. The first thrust-bearing assembly 632 may include a substantially continuous superhard bearing element 636. The substantially continuous superhard bearing element 636 may include a substantially continuous superhard bearing surface 638 having a polished surface finish (e.g., an $R_a$ surface finish of about 0.25 μm or less, about 0.05 μm or less, about 0.25 μm to about 0.0050 μm, etc.). The second thrust-bearing assembly 634 may include a plurality of tilting pad 640. Each of the plurality of tilting pads 640 may include a superhard bearing element 642. The superhard bearing element 642 may include a superhard bearing surface 644 having a polished surface finish (e.g., an $R_a$ surface finish of about 0.25 μm or less, about 0.05 μm or less, about 0.25 μm to about 0.0050 μm, etc.). The thrust-bearing apparatus 630 may exhibit a low coefficient of friction between the substantially continuous superhard bearing surface 638 having a polished surface finish and the superhard bearing surface 644 having a polished surface finish since the bearing surfaces are polished. Additionally, the substantially continuous superhard bearing surface 638 and superhard bearing surface 644 may promote fluid film development therebetween.

Figure 6A:
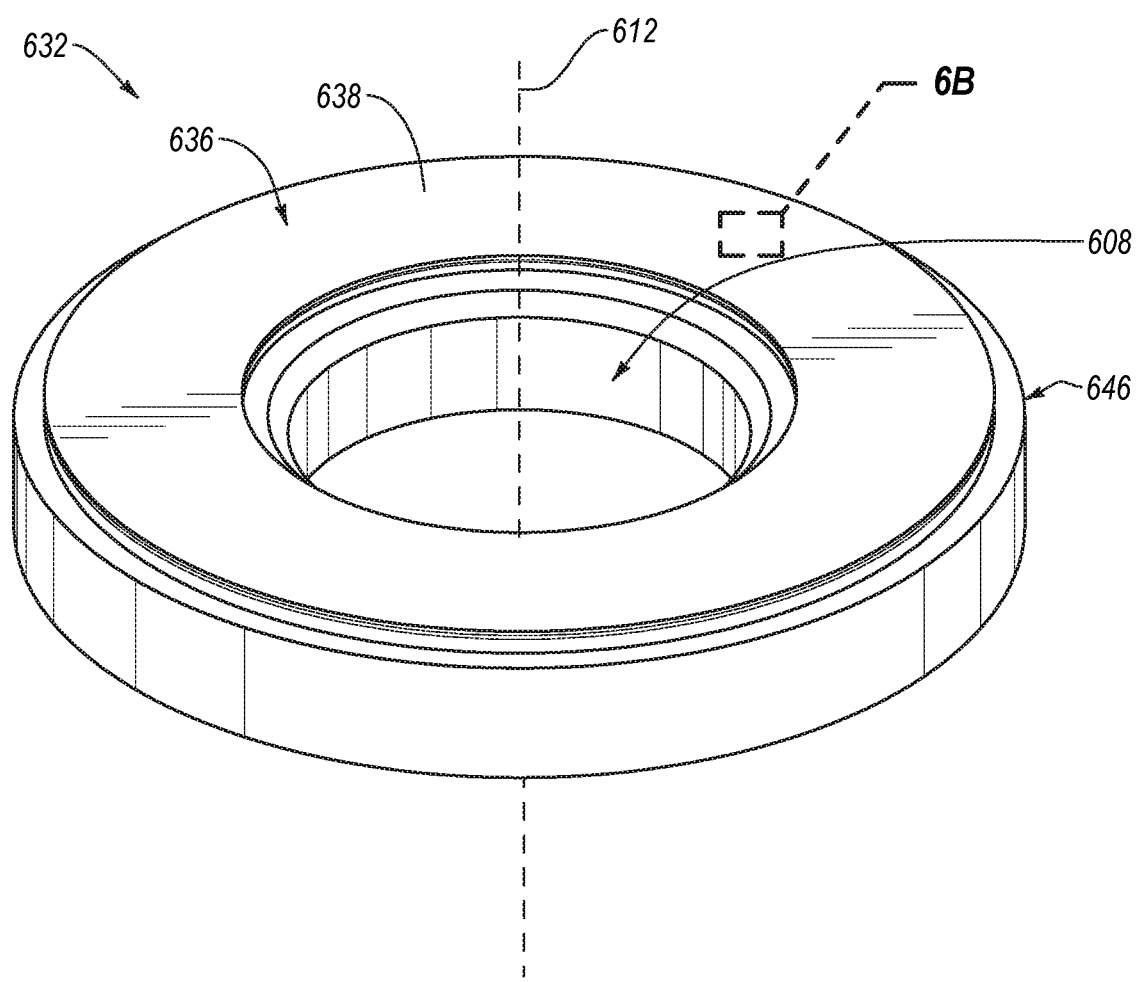
FIG. 6A is an isometric view of a first thrust-bearing assembly including a substantially continuous superhard bearing element, according to an embodiment.
Figure 6B:
FIG. 6B is an enlarged plan view of the substantially continuous superhard bearing surface having an at least partially polished surface finish taken from box 6B of FIG. 6A.

FIG. 6A is an isometric view of the first thrust-bearing assembly 632 including the substantially continuous superhard bearing element 636, according to an embodiment. The first thrust-bearing assembly 632 may be either the stator or rotor of the thrust-bearing apparatus 630. The substantially continuous superhard element 636 may be formed of a single superhard bearing element or a formed of a plurality of superhard bearing elements. The substantially continuous superhard bearing element 636 may be formed from any of the superhard materials disclosed herein. The substantially continuous superhard bearing element 636 may initially include a substantially continuous superhard bearing surface 638 having a relatively rough surface that exhibits a relatively high coefficient of friction. The substantially continuous superhard bearing surface 638 may be polished using any of the polishing techniques disclosed herein or any other suitable technique to form a substantially continuous superhard bearing surface 638 having a polished surface finish exhibiting any of the surface finishes and/or coefficients of friction disclosed herein. FIG. 6B is an enlarged view of the substantially continuous superhard bearing surface 638 having an at least partially polished surface finish that may exhibit any of the surface roughness values disclosed herein. Similar to the superhard bearing surface 106 shown in FIG. 1D, the substantially continuous superhard bearing surface 638 may exhibit fewer and less prominent irregularities 614 than the substantially continuous superhard bearing surface 638 having a relatively rough surface. As such, the substantially continuous superhard bearing surface 638 having a polished surface finish may exhibit a relatively low coefficient of friction.

The first thrust-bearing assembly 632 further includes a first support ring 646. The first support ring 646 may be formed of any of the support materials disclosed herein and may include an opening 608 configured to receive a shaft 654 (shown in FIG. 6E). The first support ring 646 may also include an annular slot configured to receive the substantially continuous superhard bearing element 636. The substantially continuous superhard bearing element 636 may be disposed in the annular slot of the first support ring 646 and secured therein using any of the methods disclosed herein. The substantially continuous superhard bearing surface 638 may be polished before or after the substantially continuous superhard bearing element 636 is mounted to the first support ring 646. In one embodiment, the first thrust-bearing assembly 632 is packaged prior to being installed and used in operation.

In an embodiment, the substantially continuous superhard bearing element 636 may be machined to include a substantially continuous superhard bearing surface 638 having a textured surface. The substantially continuous superhard bearing surface 638 may be machined using any of the methods disclosed herein to form a plurality of raised surface features. Additionally the plurality of raised surface feature may exhibit any average depth "d", cross-sectional shape, or geometry disclosed herein as shown in FIGS. 3D to 3F. The substantially continuous superhard bearing surface 638 may be machined to form a plurality of raised surface features before or after the substantially continuous superhard bearing element 636 is secured to the first support ring 646.

Additionally examples of substantially continuous superhard bearing elements that may be employed are disclosed in U.S. Pat. Nos. 8,220,999, 8,545,103, and U.S. Provisional Patent Application No. 62/087,132. U.S. Pat. Nos. 8,220, 999, 8,545,103, and U.S. Provisional Patent Application No. 62/087,132 are each incorporated herein, in their entirety, by this reference.

The substantially continuous superhard bearing surface 638 may include a maximum lateral width "W," such as a maximum diameter. In an embodiment, the maximum later width "W" is about 35 mm to about 350 mm, such as about 45 mm to about 80 mm, about 50 mm to about 75 mm, about 75 mm to about 100 mm, and about 100 mm to about 350 mm. In another embodiment, the maximum later width "W" is greater than about 45 mm (e.g. greater than about 50 mm, greater than about 75 mm, greater than about 100 mm, greater than about 350 mm). The maximum later width "W" may be selected based on the application of the thrust-bearing assembly 100 exhibiting a maximum lateral width "W" of about 45 mm to about 80 mm.

Figure 6C:
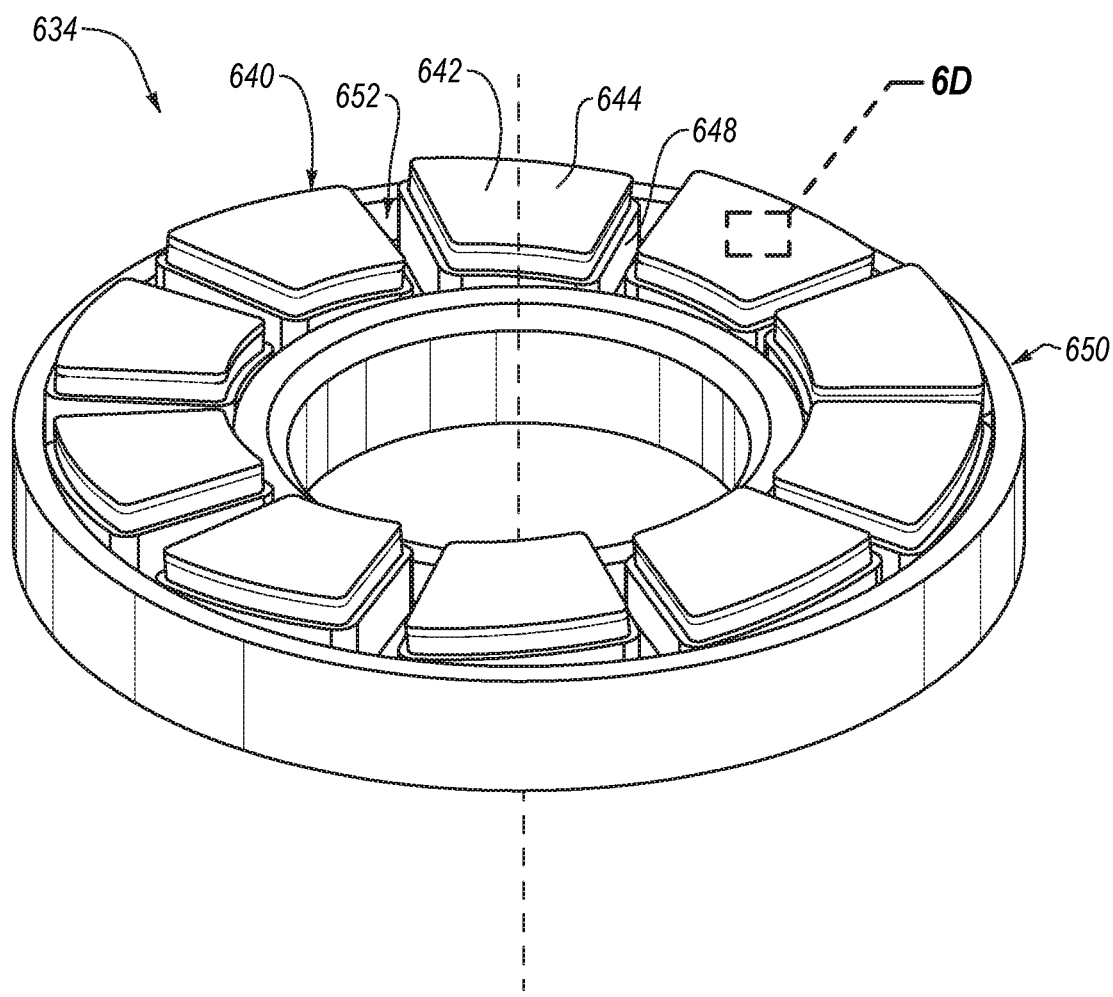
FIG. 6C is an isometric view of a second thrust-bearing assembly including a plurality of tilting pads, according to an embodiment.
Figure 6D:
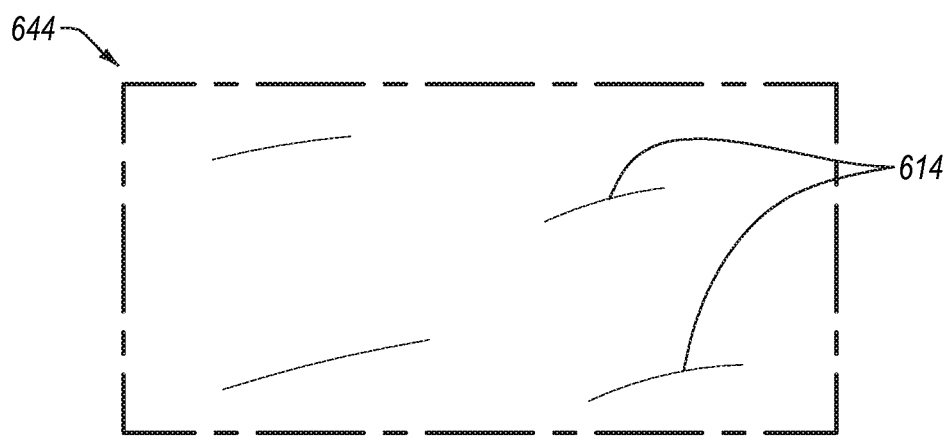
FIG. 6D is an enlarged plan view of the superhard bearing surface of a tilting pad having an at least partially polished surface finish taken from box 6D of FIG. 6C.

FIG. 6C is an isometric view of a second thrust-bearing assembly 634 including a plurality of tilting pads 640, according to an embodiment. The second thrust-bearing assembly 634 may be either the stator or the rotor of the thrust-bearing apparatus 630. The second thrust-bearing assembly 634 may include a plurality of circumferentially spaced tilting pads 640. The plurality of tilting pads 640 may include, for instance, fixed tilting pads, adjustable tilting pads, self-establishing tilting pads, other bearing pads or elements, or combinations of the foregoing.

Each tilting pad 640 may include a superhard bearing element 642. The superhard bearing element 642 may include any superhard materials disclosed herein and may be secured to a support plate 648. The support plate 648 may be formed of a metal, an alloy, a cemented carbide material, other material, or any combination thereof. The superhard bearing element 642 may be secured to the support plate 648 by brazing, welding, or other suitable attachment method.

The plurality of tilting pads 640 may rotate or tilt relative a thrust-axis 612 in any suitable manner. For example, each of the plurality of tilting pads 640 may rotate or tilt using a pin, leveling links, pivotal rockers, spherical pivots, other elements, or any combination of the foregoing. In one embodiment, each of the plurality of tilting pads 640 may rotate or tilt between about negative fifteen degrees and about positive fifteen degrees (e.g., about zero degrees to about fifteen degrees), such as a positive or negative angle of about 0.5 to about 3.0 degrees.

In an embodiment, each superhard bearing element 642 may include a superhard bearing surface 644 having a relatively rough surface. In an embodiment, the superhard bearing surface 644 may be polished using any of the method disclosed herein to have an at least partially polished surface finish exhibiting any of the surface roughness values disclosed herein. In another embodiment, the superhard bearing surface having a relatively rough surface may be machined to exhibit a superhard bearing surface having a textured surface similar to or the same as the textured superhard bearing surface described and shown in FIG. 3E.

In an embodiment, the second thrust-bearing assembly 634 may include a second support ring 650. The second support ring 650 may be formed of any of the support ring materials discussed herein. The second support ring 650 may include a channel 652 formed therein configured to receive the plurality of tilting pads 640. The plurality of tilting pads 640 may be at least partially positioned in the channel 652 and are tiled and/or tiltably secured therein. The superhard bearing surfaces 644 may be textured, polished, or both before or after the plurality of tilting pads 640 are secured to the second support ring 650. For example, the superhard bearing surfaces 644 may be textured, polished, or both using any of the methods described and shown in FIGS. 1A to 3F. In an embodiment, the second thrust-bearing assembly 634 is packaged prior to being installed and used in operation using any one or more of the packaging materials disclosed herein. For example, the thrust-bearing assembly 634 may be packaged similar to thrust-bearing assembly 100 as shown and described in FIG. 1E.

Figure 6E:
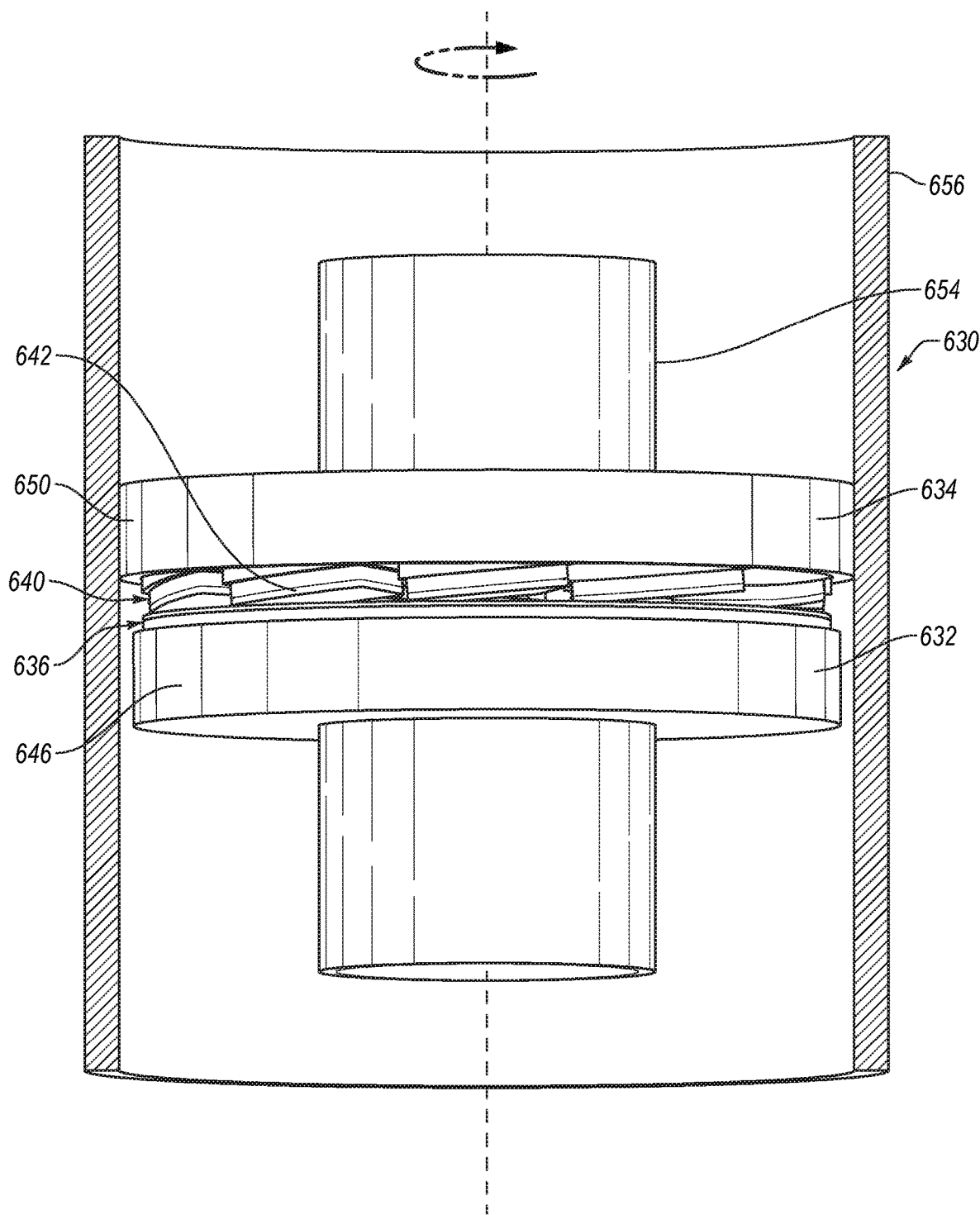
FIG. 6E is an isometric cutaway view of a thrust-bearing apparatus including a rotor configured as the first thrust-bearing assembly and a stator configured as the second thrust-bearing assembly, according to an embodiment.

Any of the described thrust-bearing assemblies (e.g., the thrust-bearing assembly 100, the thrust-bearing assembly 200, the thrust-bearing assembly 300, the first thrust-bearing assembly 632, or the second thrust-bearing assembly 634) may be employed in a thrust-bearing apparatus. FIG. 6E is an isometric cutaway view of a thrust-bearing apparatus 630 including a rotor configured as the first thrust-bearing assembly 632 and a stator configured as the second thrust-bearing assembly 634, according to an embodiment. The terms "rotor" and "stator" refer to rotating and stationary components of the thrust-bearing apparatus 630, respectively, and are not intended to be limiting. For example, the first bearing assembly 632 may be a stator and the second bearing assembly 634 may be a rotor, if desired.

As shown in FIG. 6E, a shaft 654 may be coupled to the first support ring 646 of the first thrust-bearing assembly 632 and operably coupled to an apparatus capable of rotating the shaft 654. A housing 656 may be secured to the second support ring 650 of the second thrust-bearing assembly 634 and may extend circumferentially about the shaft 654, the first thrust-bearing assembly 632, and the second thrust-bearing assembly 634. The shaft 654 and the housing 656 may be secured to the first support ring 646 and the second support ring 650, respectively, by press-fitting, a threaded connection, or by using another suitable technique.

In operation, lubrication, drilling fluid, mud, or some other fluid may be pumped between the shaft 654 and the housing 656, and between the substantially continuous superhard bearing element 636 and the plurality of tilting pads 640. More particularly, rotation of the first thrust-bearing assembly 632 at sufficient rotational speed may sweep the fluid onto the superhard bearing elements 642 of the plurality of tilting pads 640 and may allow a fluid film to develop between the substantially continuous superhard bearing element 636 and the superhard bearing elements 642 of the plurality of tilting pads 640. The fluid film may develop under certain operational conditions in which the rotational speed of the first thrust-bearing assembly 632 is sufficiently great and the thrust-load is sufficiently low. The relatively low coefficient of friction of the substantially continuous superhard bearing surface 638 and/or the superhard bearing surfaces 644 having a relatively polished surface finish may facilitate the formation of the fluid film. Additionally, the low coefficient of friction of the substantially continuous superhard bearing surface 638 and/or each of the superhard bearing surface 644 may improve operation of the thrust-bearing apparatus 630 when the fluid film is not formed (e.g., decreased heat generation, less torque to rotate, decrease likelihood of chipping).

In an embodiment, the thrust-bearing apparatus 630 may include different thrust-bearing assemblies. For example, the rotor may include any of the thrust-bearing assemblies disclosed herein, such as the thrust-bearing assembly 100, the thrust-bearing assembly 200, the thrust-bearing assembly 300, the first thrust-bearing assembly 632, or the second thrust-bearing assembly 634. Similarly, the stator may include any of the thrust-bearing assemblies disclosed herein, such as the thrust-bearing assembly 100, the thrust-bearing assembly 200, the thrust-bearing assembly 300, the first thrust-bearing assembly 632, or the second thrust-bearing assembly 634. In an embodiment, the rotor and the stator include substantially similar thrust-bearing assemblies. In an embodiment, the rotor includes a different thrust-bearing assembly than the stator. In an embodiment, both the rotor and the stator include collective superhard bearing surfaces having a polished surface finishes or collective superhard bearing surfaces having textured surfaces. In an embodiment, the rotor includes a collective superhard bearing surface having a polished surface finish, while the stator includes a collective superhard bearing surface having a textured surface, vice versa, or both may have a polished and/or textured surface. In another embodiment, at least one of the rotor or the stator includes at least one superhard bearing surface having a relatively rough surface. In another embodiment, at least one of the rotor or the stator includes at least one PCD bearing surface while the other rotor or stator includes a non-diamond superhard bearing surface (e.g., silicon carbide) having a textured surface. The textures surface of the non-diamond superhard bearing surface may wear preferentially against the PCD superhard bearing surface.

Figure 7:
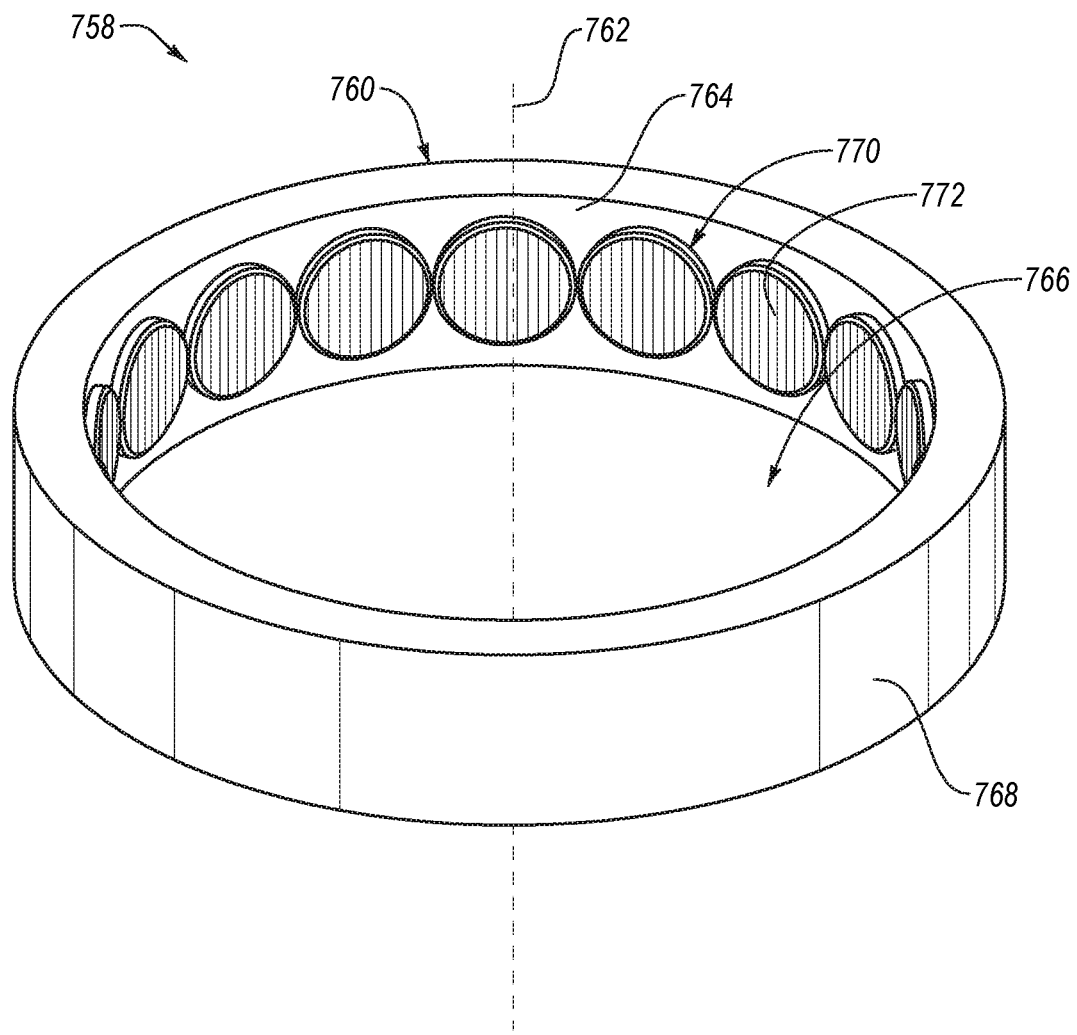
FIG. 7 is isometric view of a radial bearing assembly including a plurality of superhard bearing elements each of which includes a superhard bearing surface having a textured surface, according to an embodiment.

The embodiments and concepts disclosed in relation to the thrust-bearing assemblies and apparatuses described above may also be employed in radial bearing assemblies and apparatuses. FIG. 7 is isometric view illustrating a radial bearing assembly 758 according to an embodiment. The radial bearing assembly 758 may include a support ring 760 extending about a rotation axis 762. The support ring 760 may include an inner peripheral surface 764 defining a central opening 766 that is capable of receiving, for example, an inner support ring or inner race. The support ring 760 may also include an outer peripheral surface 768. A plurality of superhard bearing elements (e.g., sliding superhard bearing elements) may be distributed circumferentially about the rotation axis 762. Each superhard bearing element 770 may be formed of any of the superhard bearing materials disclosed herein. In one embodiment, each of the superhard bearing elements 770 may include a concavely-curved superhard bearing surface 772 (e.g., curved to lie on an imaginary cylindrical surface) having a textured surface exhibiting any of the textured embodiments or features disclosed herein and as described with respect to FIGS. 3A-3F. In another embodiment, the superhard bearing surface 772 may have a polished surface finish exhibiting any of the polished surface embodiments or features disclosed herein. The superhard bearing elements 770 may be distributed circumferentially about the rotation axis 762 in a corresponding recess formed in the support ring 760. The superhard bearing elements may have a generally cylindrical shape or any other suitable shape. In an embodiment, the radial bearing assembly 758 is packaged prior to being installed and used in operation using any one or more of the packaging embodiments or features disclosed herein.

Figure 8:
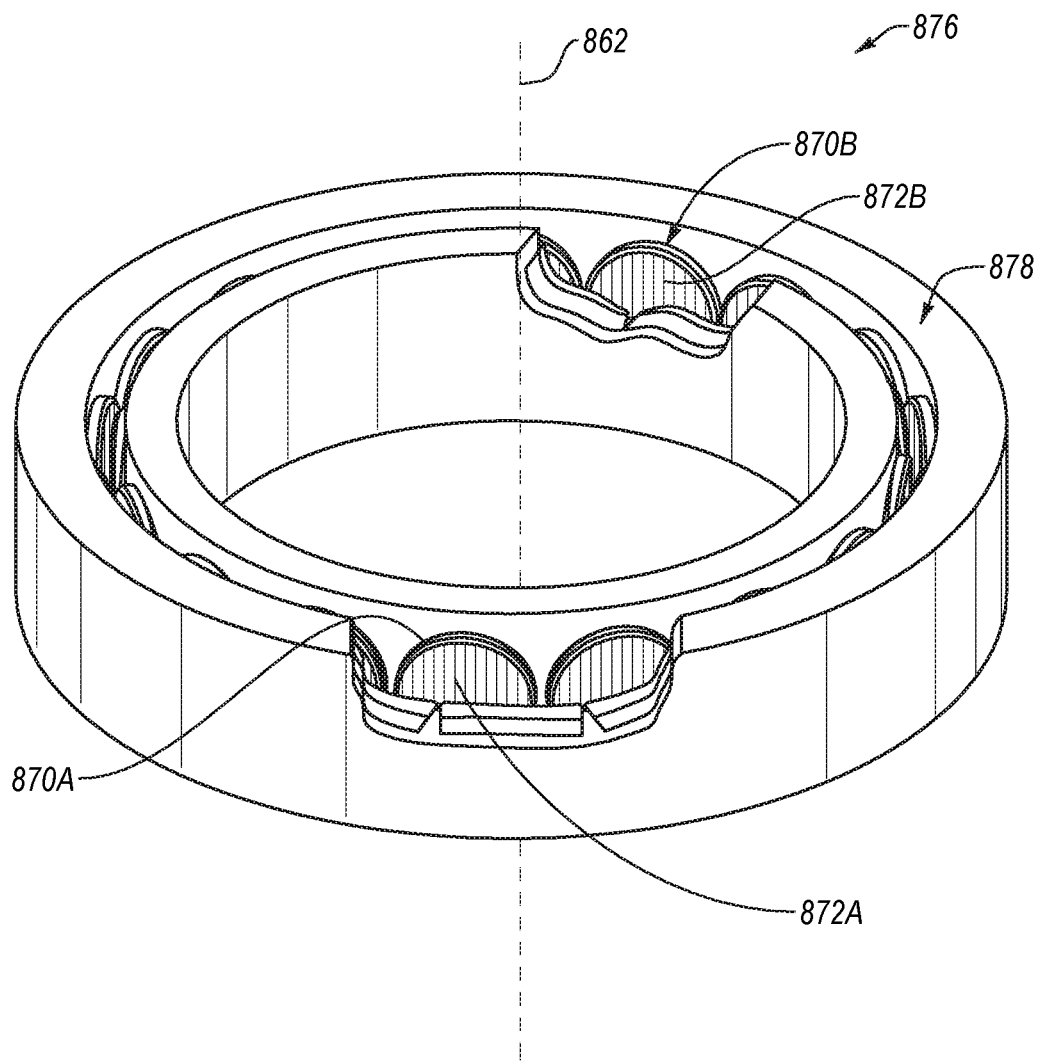
FIG. 8 is an isometric cutaway view of a radial bearing apparatus according to an embodiment.

FIG. 8 is an isometric cutaway view of a radial bearing assembly 858 according to an embodiment. The radial bearing apparatus 876 may include an inner race 874. The inner race 874 may include a plurality of circumferentially-adjacent superhard bearing elements 870A distributed about the rotation axis 862. Each of the superhard bearing elements 870A may include a convexly-curved superhard bearing surface 872A having a textured surface that collectively forms the collective inner race superhard bearing surface. In one embodiment, the at least some of the bearing surfaces may exhibit any of the textured embodiments and features disclosed herein and as described with respect to FIGS. 3A-3F. In another embodiment, at least some of the bearing surfaces may exhibit any of the at least partially polished surfaces disclosed herein and as described with respect to FIGS. 1A-2F. In another embodiment, at least some of the bearing surfaces may exhibit any of the at least partially textured surface and at least partially polished surface disclosed herein and as described herein. The radial bearing apparatus 876 may further include an outer race 878 (i.e., stator) that extends about and receives the inner race 874. The outer race 878 may include a plurality of circumferentially-adjacent superhard bearing element 870B distributed about the rotation axis 862, each of which includes a concavely-curved superhard bearing surface 872B. For example, in an embodiment, each concavely-curved superhard bearing surfaces may have a textured surface.

The collective inner race superhard bearing surface and the collective outer race superhard bearing surface may wear-in rapidly, if textured. In an embodiment, the collective inner race superhard bearing surface and the collective outer race superhard bearing surface may also be at least partially polished to exhibit a low coefficient of friction. For example, wearing-in the collective inner race superhard bearing surface 872A and the collective outer race superhard bearing surface 872B may decrease the coefficient of friction between the two surfaces and thereby may exhibit a low coefficient of friction. The relatively low coefficient of friction may decrease heat generated during operation, decrease the torque required to rotate the inner race 874 relative the outer race 878, facilitate formation of a fluid film, and/or decrease the likelihood of chipping on either surface.

In an embodiment, the inner race 874 and/or the outer race 878 may include one or more superhard bearing elements 870A or 870B having a superhard bearing surface 872A or 872B exhibiting an at least partially polished surface finish exhibiting any of the polished features (e.g., surface finishes) disclosed herein. A radial bearing assembly 858 including superhard bearing surface having an at least partially polished surface finish may decrease the coefficient of friction between the collective inner race superhard bearing surface and the collective outer race superhard bearing surface during use.

In an embodiment, both the inner race 874 and the outer race 878 may include collective superhard bearing surface having a textured surface finish. In another embodiment, both the inner race 874 and the outer race 878 may include collective superhard bearing surface having a polished surface finish. In another embodiment, at least one of the inner race 874 or the outer race 878 may include collective superhard bearing surface having a polished surface finish while the other race may include a collective superhard bearing surface having a textured surface. In another embodiment, at least one of the inner race 874 or the outer race 878 may include collective superhard bearing surface having a polished surface finish and a textured surface. In another embodiment, at least one of the inner race 874 or the outer race 878 may include collective superhard bearing surface having a polished surface finish while the other race may include a collective superhard bearing surface having a relatively rough surface. In another embodiment, at least one of the inner race 874 or the outer race 878 may include collective superhard bearing surface having a textured surface finish while the other race may include a collective superhard bearing surface having a relatively rough surface.

Figure 9:
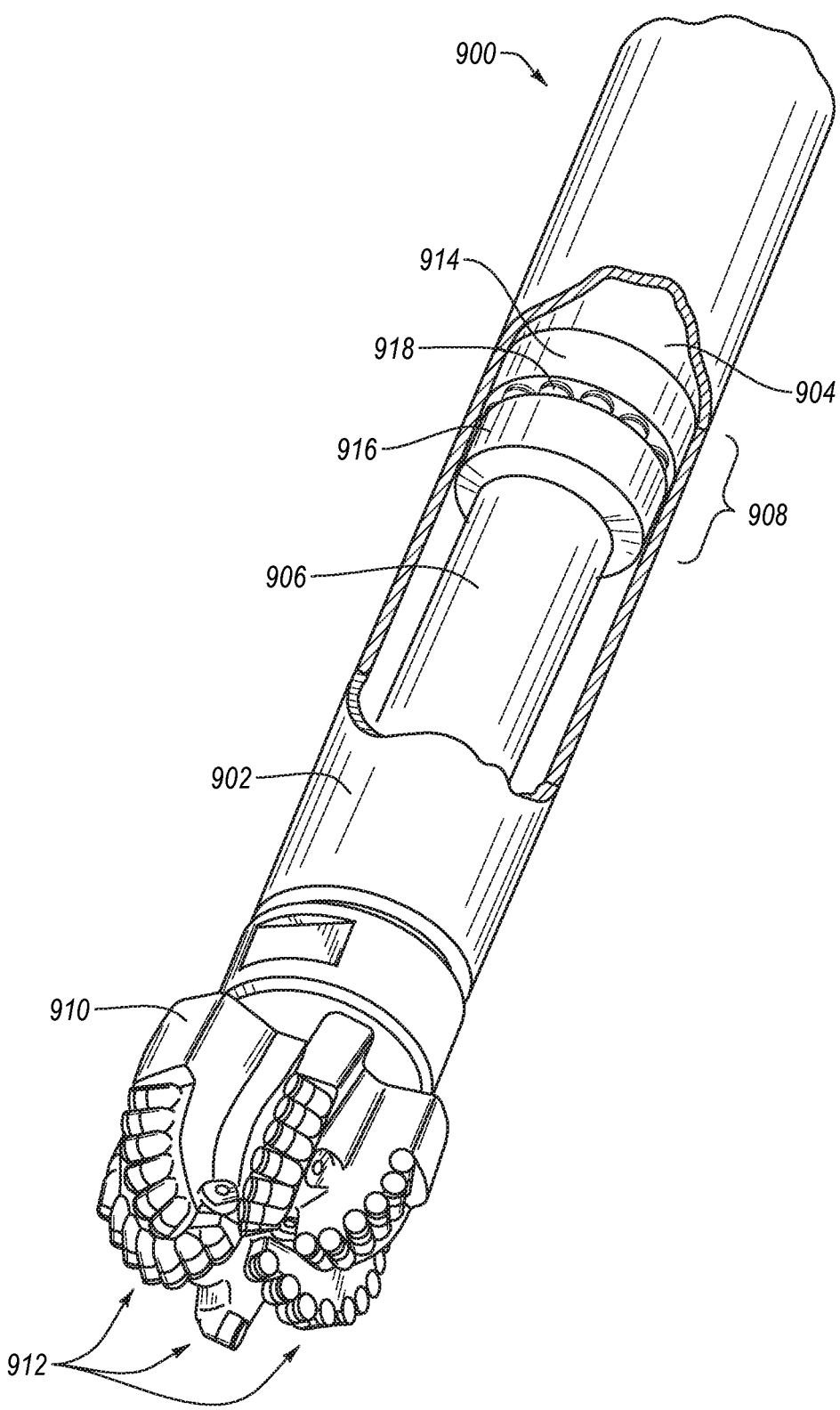
FIG. 9 is a schematic isometric cutaway view of a subterranean drilling system according to an embodiment.

Any of the embodiments for bearing apparatuses discussed above may be used in a subterranean drilling system. FIG. 9 is a schematic isometric cutaway view of an embodiment of a subterranean drilling system 900 according to an embodiment that uses a thrust-bearing apparatus. The subterranean drilling system 900 includes a housing 902 enclosing a downhole drilling motor 904 (i.e., a motor, turbine, or any other device capable of rotating an output shaft) that is operably connected to an output shaft 906. A thrust-bearing apparatus 908 is operably coupled to the downhole drilling motor 904. The thrust-bearing apparatus 908 may be configured as any of the previously described thrust-bearing apparatus embodiments. A rotary drill bit 910 configured to engage a subterranean formation and drill a borehole is connected to the output shaft 906. The rotary drill bit 910 is shown as so-called "fixed cutter" drill bit including a plurality of blades having a plurality of PDC cutting elements 912 mounted thereon. However, in other embodiments, the rotary drill bit 910 may be configured as a roller cone bit including a plurality of roller cones.

The thrust-bearing apparatus 908 includes a stator 914 that does not rotate and a rotor 916 that is attached to the output shaft 906 and rotates with the output shaft 906. In an embodiment, the stator 914 may include a plurality of circumferentially spaced tilting pads bearing segments 918 and a first plurality of sliding superhard bearing elements secured using retention elements (e.g., brazing, press-fitting, pins, interference-fit pins, threaded fasteners, etc.), as previously described such as with respect to the thrust-bearing assemblies shown in FIGS. 1 to 2B. In such an embodiment, the rotor 916 may include a continuous bearing element or, optionally, a second plurality of sliding superhard bearing elements such as shown in the thrust-bearing assemblies shown in FIGS. 6-8.

In operation, drilling fluid may be circulated through the downhole drilling motor 904 to generate torque and effect rotation of the output shaft 906 and the rotary drill bit 910 attached thereto so that a borehole may be drilled. A portion of the drilling fluid is also used to lubricate opposing bearing surfaces of the stator 914 and rotor 916. As the borehole is drilled, pipe sections may be connected to the subterranean drilling system 900 to form a drill string capable of progressively drilling the borehole within the earth.

Although the present invention has been disclosed and described by way of some embodiments, it is apparent to those skilled in the art that several modifications to the described embodiments, as well as other embodiments of the present invention are possible without departing from the spirit and scope of the present invention. Additionally, the words "including" and "having," as used herein, including the claims, shall be open ended and have the same meaning as the word "comprising."

We claim:
1. An assembly comprising:
a bearing assembly including a support structure and at least one superhard bearing element including polycrystalline diamond table having a bearing surface, the polycrystalline diamond table being at least partially leached to remove a catalyst material from interstitial regions of the polycrystalline table, the bearing surface having an at least partially polished surface finish that exhibits an $R_a$ surface finish of about 0.0025 µm or less, the at least one superhard bearing element secured to the support structure; and
at least one packaging material adjacent to the support structure and the at least one superhard bearing element, the at least one packaging material configured to protect the at least partially polished surface finish of the at least one superhard bearing element.

2. The assembly of claim 1, wherein the at least partially polished surface finish exhibits an $R_a$ surface finish of about 0.0013 μm or less.

3. The assembly of claim 1, wherein the at least partially polished surface finish exhibits an $R_a$ surface finish of about 0.00025 μm or less.

4. The assembly of claim 1, wherein the at least one superhard bearing element includes a plurality of superhard bearing elements secured to the support structure, each of the plurality of superhard bearing elements having a bearing surface having an at least partially polished surface finish, the bearing surfaces being substantially coplanar with each other.

5. The assembly of claim 1, wherein the at least partially polished surface finish does not uniformly cover the bearing surface.

6. The assembly of claim 1, wherein the at least partially polished surface finish only covers a portion of the bearing surface.

7. The assembly of claim 1, wherein the at least one superhard bearing element includes a plurality of sliding superhard bearing elements.

8. The assembly of claim 1, wherein the at least one superhard bearing element includes a plurality of tilting pads.

9. The assembly of claim 1, wherein the at least one superhard bearing element includes a single, substantially continuous superhard bearing element.

10. The assembly of claim 1, wherein the support structure and the at least one superhard bearing element are configured as a thrust bearing assembly.

11. The assembly of claim 1, wherein the support structure and the at least one superhard bearing element are configured as a radial bearing assembly.

12. The assembly of claim 1, wherein the support structure and the at least one superhard bearing element are configured as a tilting pad bearing assembly.

13. The assembly of claim 1, wherein the support structure comprises metal.

14. The assembly of claim 1, wherein the support structure comprises a ring and wherein the at least one superhard bearing element comprises a plurality of superhard bearing elements circumferentially disposed about an axis of the ring.

15. The assembly of claim 1, wherein the at least one superhard bearing element is fully leached.

16. The assembly of claim 1, wherein the at least one superhard bearing element includes a substrate secured to the polycrystalline diamond table.

17. The assembly of claim 16, wherein the substrate is bonded to the polycrystalline diamond table and wherein the substrate comprises cobalt-cemented tungsten carbide.

18. The assembly of claim 16, wherein the substrate is secured to the polycrystalline diamond table by brazing or welding.

* * * * *